(12) United States Patent
Hajjar

(10) Patent No.: US 7,878,657 B2
(45) Date of Patent: Feb. 1, 2011

(54) SERVO FEEDBACK CONTROL BASED ON INVISIBLE SCANNING SERVO BEAM IN SCANNING BEAM DISPLAY SYSTEMS WITH LIGHT-EMITTING SCREENS

(75) Inventor: Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 870 days.

(21) Appl. No.: 11/769,580

(22) Filed: Jun. 27, 2007

(65) Prior Publication Data
US 2009/0001272 A1  Jan. 1, 2009

(51) Int. Cl.
G03B 21/00 (2006.01)
G01J 1/42 (2006.01)
G02B 26/10 (2006.01)

(52) U.S. Cl. .............. 353/29; 359/204.1; 250/348; 250/354.1

(58) Field of Classification Search .............. 353/29, 353/30, 31, 47; 359/204.1, 204.2, 204.4; 250/201.1, 234, 235, 236, 340, 347, 348, 250/362, 372, 354.1
See application file for complete search history.

(56) References Cited

U.S. PATENT DOCUMENTS

| | | | |
|---|---|---|---|
| 2,439,181 A | 5/1946 | Nicoll | |
| 3,025,161 A | 3/1962 | Thaddeus | |
| 3,556,637 A | 1/1971 | Palmquist | |
| 3,652,956 A | 3/1972 | Pinnow et al. | |
| 3,691,482 A | 9/1972 | Pinnow et al. | |
| 3,750,189 A | 7/1973 | Fleischer | |
| 4,165,154 A | 8/1979 | Takahashi | |
| 4,166,233 A | 8/1979 | Stanley | |
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,737,840 A | 4/1988 | Morishita | |
| 4,816,920 A | 3/1989 | Paulsen | |
| 4,872,750 A | 10/1989 | Morishita | |
| 4,923,262 A | 5/1990 | Clay | |

(Continued)

FOREIGN PATENT DOCUMENTS

DE  10044603  4/2001

(Continued)

OTHER PUBLICATIONS

Supplementary European Search Report dated Jul. 29, 2009 for European Patent Application No. 06836510.5 (6 pages).

(Continued)

Primary Examiner—John R Lee
(74) Attorney, Agent, or Firm—Fish & Richardson P.C.

(57) ABSTRACT

Scanning beam display systems that scan at least one invisible servo beam and an excitation beam onto a screen that emits visible light under excitation of the light of the excitation beam and control optical alignment of the excitation beam based on positioning of the servo beam on the screen via a feedback control.

20 Claims, 19 Drawing Sheets

U.S. PATENT DOCUMENTS

| | | |
|---|---|---|
| 4,978,202 A | 12/1990 | Yang |
| 4,979,030 A | 12/1990 | Murata |
| 5,054,866 A | 10/1991 | Tomita et al. |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,136,426 A | 8/1992 | Linden et al. |
| 5,138,441 A | 8/1992 | Tanaka |
| 5,140,604 A | 8/1992 | Alablanche et al. |
| 5,146,355 A | 9/1992 | Prince et al. |
| 5,166,944 A | 11/1992 | Conemac |
| 5,175,637 A | 12/1992 | Jones et al. |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,296,922 A | 3/1994 | Mitani et al. |
| 5,365,288 A | 11/1994 | Dewald et al. |
| 5,389,324 A | 2/1995 | Lewis et al. |
| 5,414,521 A | 5/1995 | Ansley |
| 5,442,254 A | 8/1995 | Jaskie |
| 5,473,396 A | 12/1995 | Okajima et al. |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,698,857 A | 12/1997 | Lambert et al. |
| 5,710,021 A | 1/1998 | Hintz et al. |
| 5,715,021 A | 2/1998 | Gibeau et al. |
| 5,716,118 A | 2/1998 | Sato et al. |
| 5,870,224 A | 2/1999 | Saitoh et al. |
| 5,882,774 A | 3/1999 | Jonza et al. |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,918 A | 12/1999 | Do et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,069,599 A | 5/2000 | Py et al. |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker et al. |
| 6,226,126 B1 | 5/2001 | Conemac |
| 6,252,254 B1 | 6/2001 | Soules et al. |
| 6,255,670 B1 | 7/2001 | Srivastava et al. |
| 6,276,802 B1 | 8/2001 | Naito |
| 6,288,817 B2 | 9/2001 | Rowe |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,429,584 B2 | 8/2002 | Kubota |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,986,581 B2 | 1/2006 | Sun et al. |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,147,802 B2 | 12/2006 | Sugimoto et al. |
| 7,181,417 B1 | 2/2007 | Langseth et al. |
| 7,213,923 B2 | 5/2007 | Liu et al. |
| 7,230,767 B2 | 6/2007 | Walck et al. |
| 7,239,436 B2 | 7/2007 | Oettinger et al. |
| 7,283,301 B2 | 10/2007 | Peeters et al. |
| 7,302,174 B2 | 11/2007 | Tan et al. |
| 7,474,286 B2 | 1/2009 | Hajjar et al. |
| 2001/0019240 A1 | 9/2001 | Takahashi |
| 2001/0024086 A1 | 9/2001 | Fox et al. |
| 2001/0050371 A1 | 12/2001 | Odaki et al. |
| 2002/0003233 A1 | 1/2002 | Mueller-Mach et al. |
| 2002/0008854 A1 | 1/2002 | Leigh Travis |
| 2002/0024495 A1 | 2/2002 | Lippert et al. |
| 2002/0050963 A1 | 5/2002 | Conemac et al. |
| 2002/0122260 A1 | 9/2002 | Okazaki et al. |
| 2002/0124250 A1 | 9/2002 | Proehl et al. |
| 2002/0145685 A1 | 10/2002 | Mueller-Mach et al. |
| 2002/0163702 A1 | 11/2002 | Hori et al. |
| 2002/0185965 A1 | 12/2002 | Collins et al. |
| 2003/0015692 A1 | 1/2003 | Teng et al. |
| 2003/0094893 A1 | 5/2003 | Ellens et al. |
| 2003/0184209 A1 | 10/2003 | Russ et al. |
| 2003/0184531 A1 | 10/2003 | Morikawa et al. |
| 2003/0184613 A1 | 10/2003 | Nakamura et al. |
| 2003/0184842 A1 | 10/2003 | Morikawa et al. |
| 2004/0027465 A1 | 2/2004 | Smith et al. |
| 2004/0070551 A1 | 4/2004 | Walck et al. |
| 2004/0141220 A1 | 7/2004 | Hama et al. |
| 2004/0145312 A1 | 7/2004 | Ouderkirk et al. |
| 2004/0156079 A1 | 8/2004 | Marshall et al. |
| 2004/0160516 A1 | 8/2004 | Ford |

| | | |
|---|---|---|
| 2004/0165642 A1 | 8/2004 | Lamont |
| 2004/0184123 A1 | 9/2004 | Morikawa et al. |
| 2004/0223100 A1 | 11/2004 | Kotchick et al. |
| 2004/0227465 A1 | 11/2004 | Menkara et al. |
| 2004/0263074 A1 | 12/2004 | Baroky et al. |
| 2005/0001225 A1 | 1/2005 | Yoshimura et al. |
| 2005/0012446 A1 | 1/2005 | Jermann et al. |
| 2005/0023962 A1 | 2/2005 | Menkara et al. |
| 2005/0023963 A1 | 2/2005 | Menkara et al. |
| 2005/0051790 A1 | 3/2005 | Ueda |
| 2005/0093818 A1 | 5/2005 | Hatam-Tabrizi et al. |
| 2005/0094266 A1 | 5/2005 | Liu et al. |
| 2006/0050015 A1 | 3/2006 | Kusunoki et al. |
| 2006/0066508 A1 | 3/2006 | Walck et al. |
| 2006/0081793 A1 | 4/2006 | Nestorovic et al. |
| 2006/0082873 A1 | 4/2006 | Allen et al. |
| 2006/0088951 A1 | 4/2006 | Hayashi et al. |
| 2006/0132021 A1 | 6/2006 | Naberhuis et al. |
| 2006/0139580 A1 | 6/2006 | Conner |
| 2006/0197922 A1 | 9/2006 | Liu et al. |
| 2006/0221021 A1 | 10/2006 | Hajjar et al. |
| 2006/0221022 A1 | 10/2006 | Hajjar |
| 2006/0227087 A1 | 10/2006 | Hajjar et al. |
| 2006/0262243 A1 | 11/2006 | Lester et al. |
| 2006/0266958 A1 | 11/2006 | Shimizu et al. |
| 2006/0290898 A1 | 12/2006 | Liu et al. |
| 2007/0014318 A1 | 1/2007 | Hajjar et al. |
| 2007/0183466 A1 | 8/2007 | Son et al. |
| 2007/0187580 A1 | 8/2007 | Kykta et al. |
| 2007/0187616 A1 | 8/2007 | Burroughs et al. |
| 2007/0188417 A1 | 8/2007 | Hajjar et al. |
| 2007/0206258 A1 | 9/2007 | Malyak et al. |
| 2007/0228927 A1 | 10/2007 | Kindler et al. |
| 2007/0229946 A1 | 10/2007 | Okada et al. |
| 2008/0018558 A1 | 1/2008 | Kykta et al. |
| 2008/0066107 A1 | 3/2008 | Moonka et al. |
| 2008/0068295 A1 | 3/2008 | Hajjar |
| 2008/0235749 A1 | 9/2008 | Jain et al. |
| 2008/0247020 A1 | 10/2008 | Malyak et al. |
| 2008/0291140 A1 | 11/2008 | Kent et al. |
| 2009/0001272 A1* | 1/2009 | Hajjar ............... 250/354.1 |
| 2009/0116107 A1 | 5/2009 | Kindler et al. |
| 2009/0153582 A1 | 6/2009 | Hajjar et al. |
| 2009/0174632 A1 | 7/2009 | Hajjar et al. |
| 2010/0097678 A1* | 4/2010 | Hajjar et al. ......... 359/198.1 |

FOREIGN PATENT DOCUMENTS

| | | |
|---|---|---|
| EP | 0196862 | 10/1986 |
| EP | 0271650 | 6/1988 |
| EP | 1150361 | 10/2001 |
| JP | 56164826 | 12/1981 |
| JP | 59-155826 | 9/1984 |
| JP | 02-157790 | 6/1990 |
| JP | 2-199975 | 8/1990 |
| JP | 5232583 | 9/1993 |
| JP | 6-46461 | 2/1994 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| KR | 2002-0024425 | 3/2002 |
| KR | 2003-0068589 | 8/2003 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/33970 | 4/2002 |
| WO | WO0229772 A2 | 4/2002 |
| WO | WO 02/057838 | 7/2002 |
| WO | WO02059693 A1 | 8/2002 |
| WO | WO 02/071148 | 9/2002 |
| WO | WO2005043232 A2 | 5/2005 |
| WO | WO 2005/119797 | 12/2005 |
| WO | WO 2006/097876 | 9/2006 |
| WO | WO 2006/107720 | 10/2006 |
| WO | WO2006107720 A1 | 10/2006 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |
| WO | WO 2008/124707 | 10/2008 |
| WO | WO 2008/144673 | 11/2008 |
| WO | WO 2009/003192 | 12/2008 |

OTHER PUBLICATIONS

Supplementary European Search Report dated Mar. 25, 2009 for European Patent Application No. 06740108.3 (7 pages).

The Korean Intellectual Property Office, Office Action dated Mar. 31, 2009 for Korean Patent Application No. 10-2007-7025455 (4 pages).

English language translation of The Korean Intellectual Property Office, Office Action dated Mar. 31, 2009 for Korean Patent Application No. 10-2007-7025455 (5 pages).

International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.

International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.

International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent $Y_2O_2S:Eu^{3+}$ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE, Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-θ and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. and M. Žumer, "26.4:Preparation of P43 Suspension and Screen-Quality Evaluation in 1-in. CRTs", 1997 SID International Symposium Digest of Technical Papers ( SID '97 Digest), vol. XVIII, pp. 440-443 (May 1997).

* cited by examiner

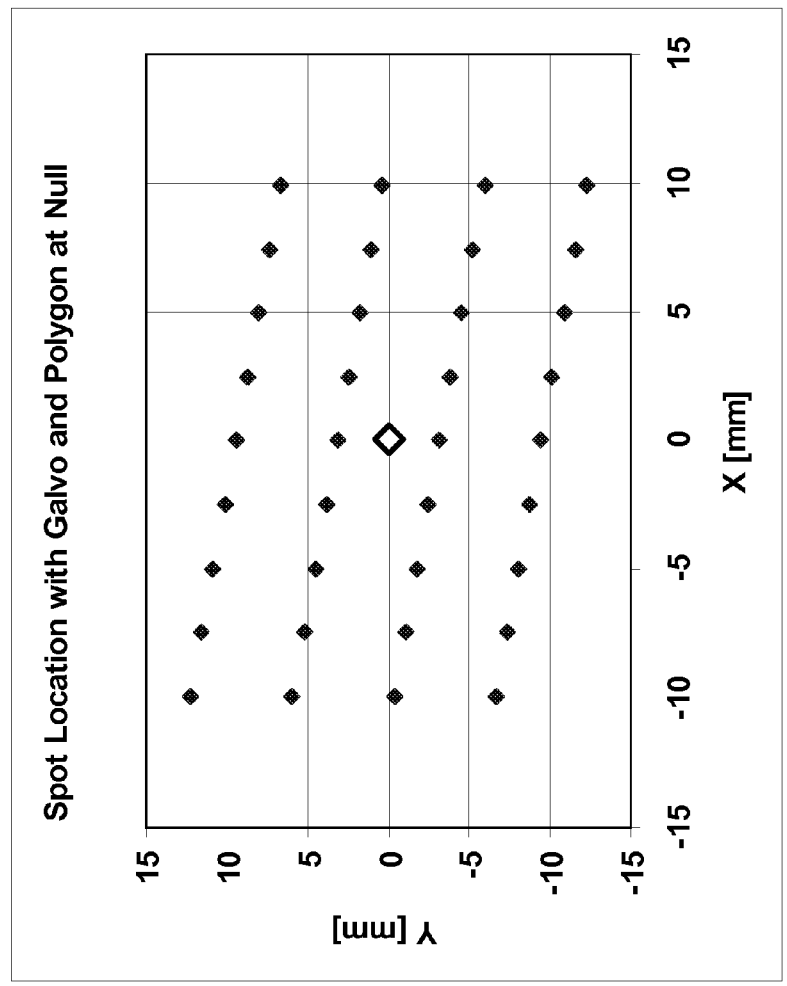

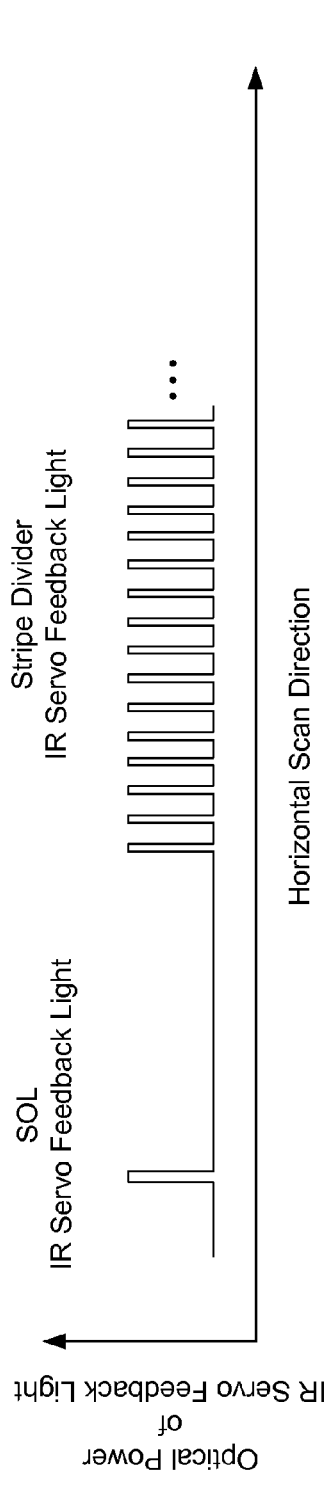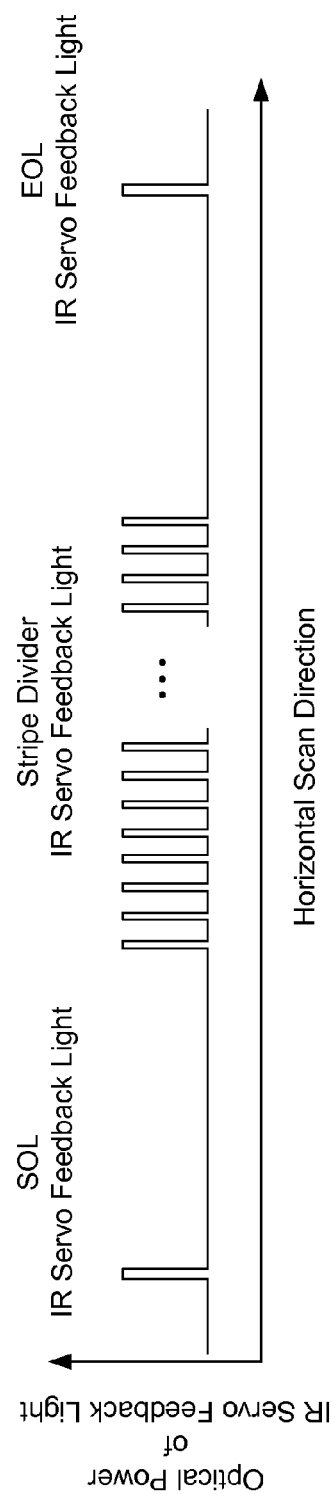

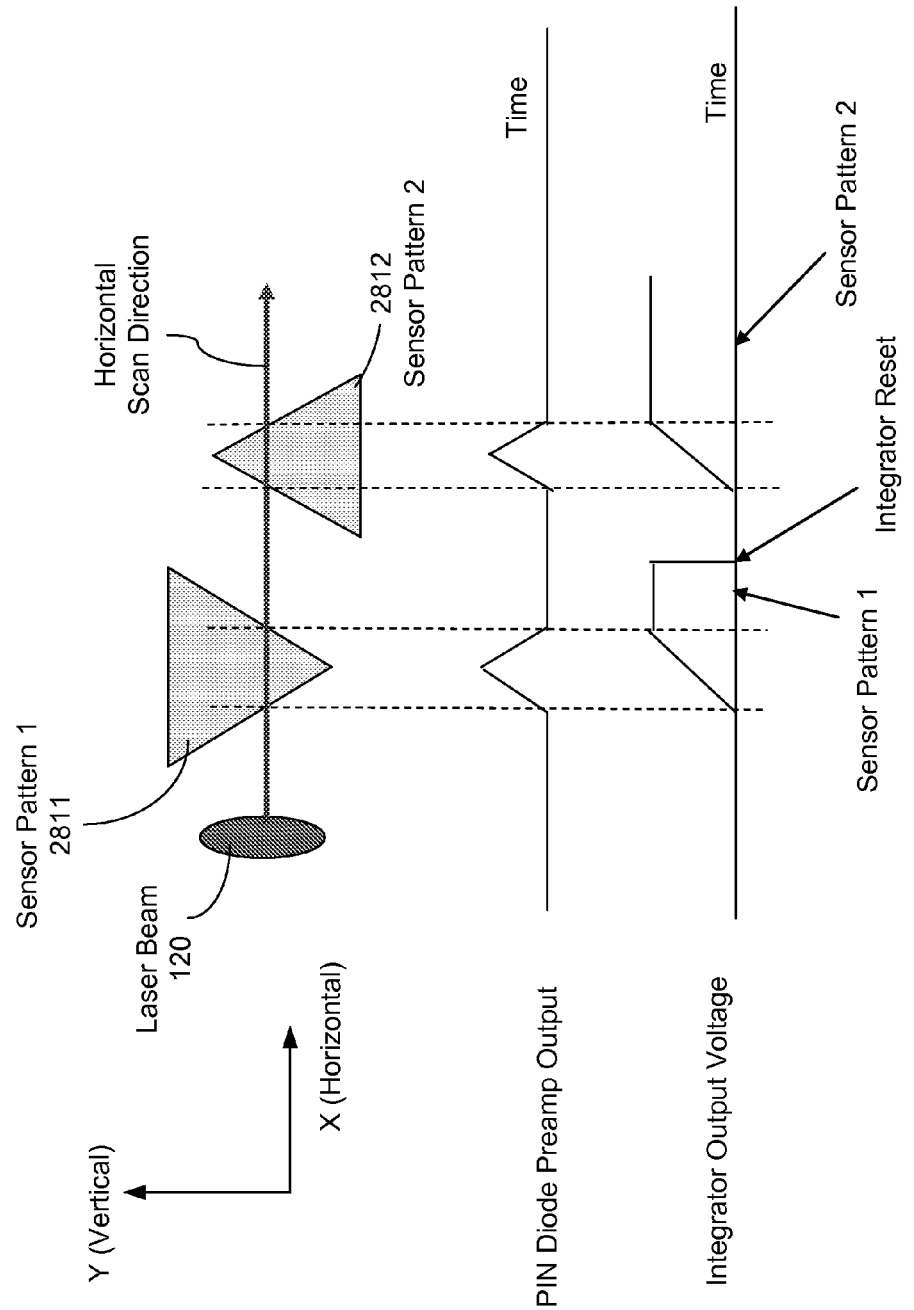

SERVO FEEDBACK CONTROL BASED ON INVISIBLE SCANNING SERVO BEAM IN SCANNING BEAM DISPLAY SYSTEMS WITH LIGHT-EMITTING SCREENS

BACKGROUND

This application relates to scanning-beam display systems.

In a scanning-beam display system, an optical beam can be scanned over a screen to form images on the screen. Many display systems such as laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

Such scanning-beam display systems can be in various configurations. For example, scanning-beam display systems may use passive screens that do not emit light but make light of the scanning beam visible to a viewer by one or a combination of mechanisms, such as optical reflection, optical diffusion, optical scattering and optical diffraction. Examples of such displays include digital light processing (DLP) displays, liquid crystal on silicon (LCOS) displays, and grating light valve (GLV) displays. Various front and rear projection displays use passive screens. Scanning-beam display systems can also use active screens such as fluorescent screens that include fluorescent materials to emit colored light under optical excitation where the emitted light forms the images visible to viewers. Examples of such display systems include cathode-ray tube (CRT) displays, plasma displays, liquid crystal displays (LCDs), light-emitting-diode (LED) displays (e.g., organic LED displays), and field-emission displays (FEDs).

SUMMARY

The specification of this application describes, among others, display systems and devices based on scanning light on a screen. The described display systems use light-emitting screens under optical excitation and at least one excitation optical beam to excite one or more light-emitting materials on a screen which emit light to form images. The fluorescent materials may include phosphor materials and non-phosphor materials such as quantum dots. Servo control mechanisms for such display systems are described. In some implementations, multiple lasers can be used to simultaneously scan multiple laser beams to illuminate one screen. For example, the multiple laser beams can illuminate one screen segment at a time and sequentially scan multiple screen segments to complete a full screen.

In one implementation, a scanning beam display system, includes an excitation light source to produce at least one excitation beam having optical pulses that carry image information; a servo light source to produce at least one servo beam at a servo beam wavelength that is invisible; a beam scanning module to receive the excitation beam and the servo beam and to scan the excitation beam and the servo beam; and a light-emitting screen positioned to receive the scanning excitation beam and the servo beam. The screen includes a light-emitting area which comprises (1) parallel light-emitting stripes which absorb light of the excitation beam to emit visible light to produce images carried by the scanning excitation beam, and (2) stripe dividers parallel to and spatially interleaved with the light-emitting stripes with each stripe divider being located between two adjacent stripes. Each stripe divider is optically reflective. An optical servo sensor is positioned to receive light of the servo beam scanning on the screen including light reflected by the stripe dividers and to produce a monitor signal indicative of positioning of the servo beam on the screen. This system includes a control unit operable to, in response to the positioning of the servo beam on the screen, adjust timing of the optical pulses carried by the scanning excitation beam in response to the monitor signal based on a relation between the servo beam and the excitation beam to control the spatial alignment of spatial positions of the optical pulses in the excitation beam on the screen.

In another implementation, a scanning beam display system includes a light-emitting screen comprising a light-emitting area which comprises (1) parallel light-emitting stripes which absorb excitation light to emit visible light, and (2) optically reflective stripe dividers parallel to and spatially interleaved with the light-emitting stripes with each stripe divider being located between two adjacent stripes. Excitation lasers are provided to produce excitation laser beams of the excitation light and at least one servo light source fixed in position relative to the excitation lasers is provided to produce at least one servo beam at a servo beam wavelength that is invisible. This system also includes a beam scanning module to receive the excitation laser beams and the servo beam and to scan the excitation laser beams and the servo beam; at least one first optical servo sensor positioned to receive light of the servo beam reflected from the screen to produce a first monitor signal indicative of positioning of the servo beam on the screen; at least one second optical servo sensor positioned to receive light of the excitation laser beams reflected from the screen to produce a second monitor signal indicative of positioning of each excitation laser beam on the screen; and a control unit operable to, in response to the first and the second monitor signals, adjust timing of the optical pulses carried by each excitation laser beam based on a relation between the servo beam and each excitation laser beam to control the spatial alignment of spatial positions of the optical pulses in the excitation beam on the screen.

In yet another implementation, a method for controlling a scanning beam display system includes scanning at least one excitation beam modulated with optical pulses on a screen with parallel light-emitting stripes in a beam scanning direction perpendicular to the light-emitting stripes to excite the fluorescent strips to emit visible light which forms images. The screen comprises stripe dividers parallel to and spatially interleaved with the light-emitting stripes with each stripe divider being located between two adjacent stripes and each stripe divider is optically reflective. This method also includes: scanning a servo beam, which is invisible, along with the excitation beam on the screen; detecting light of the scanning servo beam from the screen including light produced by the stripe dividers to obtain a monitor signal indicative of positioning of the servo beam on the screen; and, in response to the positioning of the servo beam on the screen, adjusting timing of the optical pulses carried by the scanning excitation beam based on a relation between the servo beam and the excitation beam to control the spatial alignment of spatial positions of the optical pulses in the excitation beam on the screen.

These and other examples and implementations are described in detail in the drawings, the detailed description and the claims.

BRIEF DESCRIPTION OF THE DRAWINGS

FIG. 5A shows a map of beam positions on the screen produced by a laser array of thirty-six excitation lasers and one IR servo laser when a vertical galvo scanner and a horizontal polygon scanner are at their respective null positions.

FIGS. 13 and 14 show optical power of servo light having optical signals corresponding to stripe dividers, the start of line reference mark and end of line reference mark on the screen

FIGS. 18B and 18C show a servo feedback control circuit and its operation in using the vertical beam position reference mark in FIG. 18A to control the vertical beam position on the screen.

DETAILED DESCRIPTION

Figure 1:
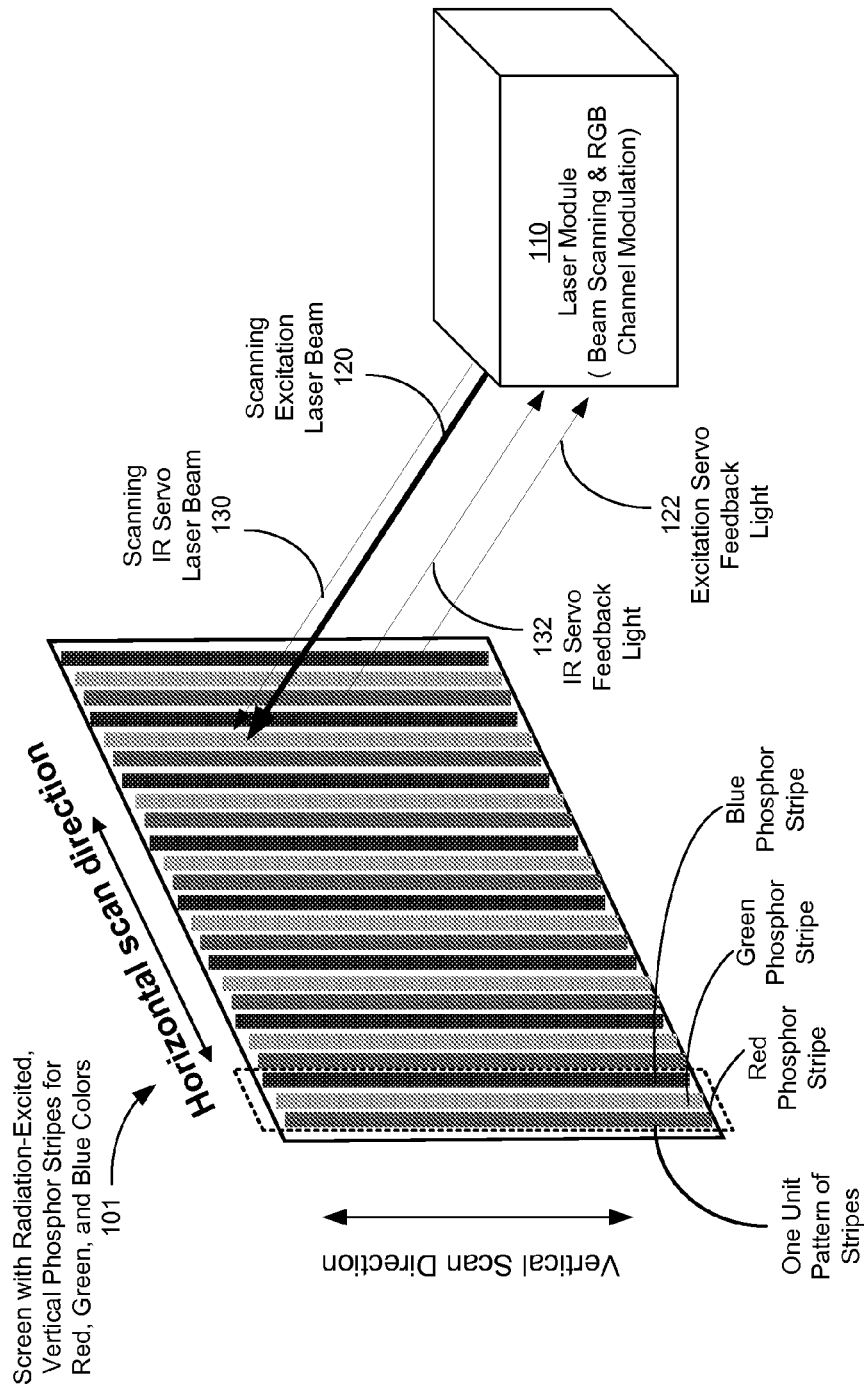
FIG. 1 shows an example scanning laser display system having a light-emitting screen made of laser-excitable light-emitting materials (e.g., phosphors) emitting colored lights under excitation of a scanning laser beam that carries the image information to be displayed.

Examples of scanning beam display systems in this application use screens with light-emitting materials or fluorescent materials to emit light under optical excitation to produce images, including laser video display systems. Various examples of screen designs with light-emitting or fluorescent materials can be used. In one implementation, for example, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. Various described systems, devices and features in the examples that use phosphors as the fluorescent materials are applicable to displays with screens made of other optically excitable, light-emitting, non-phosphor fluorescent materials. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Examples of scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 1 illustrates an example of a laser-based display system using a screen having color phosphor stripes. Alternatively, color pixilated light-emitting areas may also be used to define the image pixels on the screen. The system includes a laser module 110 to produce and project at least one scanning laser beam 120 onto a screen 101. The screen 101 has parallel color phosphor stripes in the vertical direction and two adjacent phosphor stripes are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green and blue colors. Such display systems may be configured as rear projection systems where the viewer and the laser module 110 are on the opposite sides of the screen 101. Alternatively, such display systems may be configured as front projection systems where the viewer and laser module 110 are on the same side of the screen 101.

Examples of implementations of various features, modules and components in the scanning laser display system in FIG. 1 are described in U.S. patent application Ser. No. 10/578,038 entitled "Display Systems and Devices Having Screens With Optical Fluorescent Materials" and filed on May 2, 2006 (U.S. Patent Publication No. 2008/0291140), PCT Patent Application No. PCT/US2007/004004 entitled "Servo-Assisted Scanning Beam Display Systems Using Fluorescent Screens" and filed on Feb. 15, 2007 (PCT Publication No. WO 2007/095329), PCT Patent Application No. PCT/US2007/068286 entitled "Phosphor Compositions For Scanning Beam Displays" and filed on May 4, 2007 (PCT Publication No. WO 2007/131195), PCT Patent Application No. PCT/US2007/68989 entitled "Multilayered Fluorescent Screens for Scanning Beam Display Systems" and filed on May 15, 2007 (PCT Publication No. WO 2007/134329), and PCT Patent Application No. PCT/US2006/041584 entitled "Optical Designs for Scanning Beam Display Systems Using Fluorescent Screens" and filed on Oct. 25, 2006 (PCT Publication No. WO 2007/050662). The disclosures of the above-referenced patent applications are incorporated by reference in their entirety as part of the specification of this application.

Figure 2A:
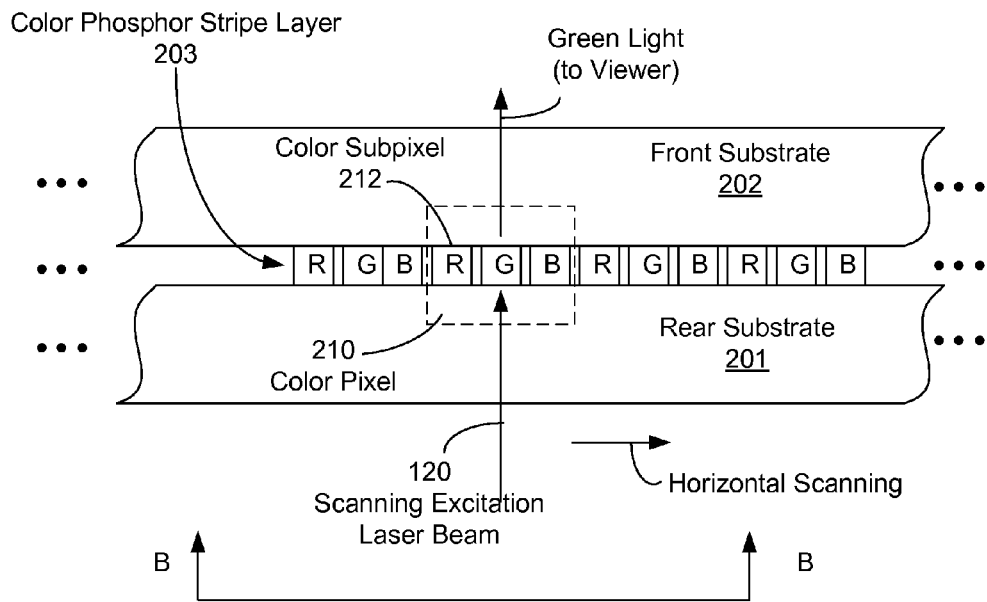
FIGS. 2A and 2B show one example screen structure with parallel light-emitting stripes and the structure of color pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202, is fixed relative to the rear substrate 201 and faces the viewer in a rear projection configuration. A color phosphor stripe layer 203 is placed between the substrates 201 and 202 and includes phosphor stripes. The color phosphor stripes for emitting red, green and blue colors are represented by "R", "G" and "B," respectively. The front substrate 202 is transparent to the red, green and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
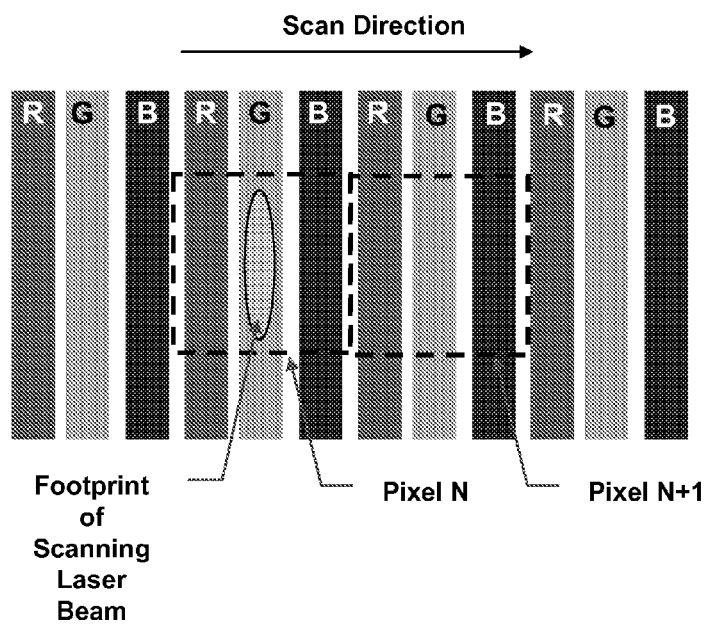

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 3:
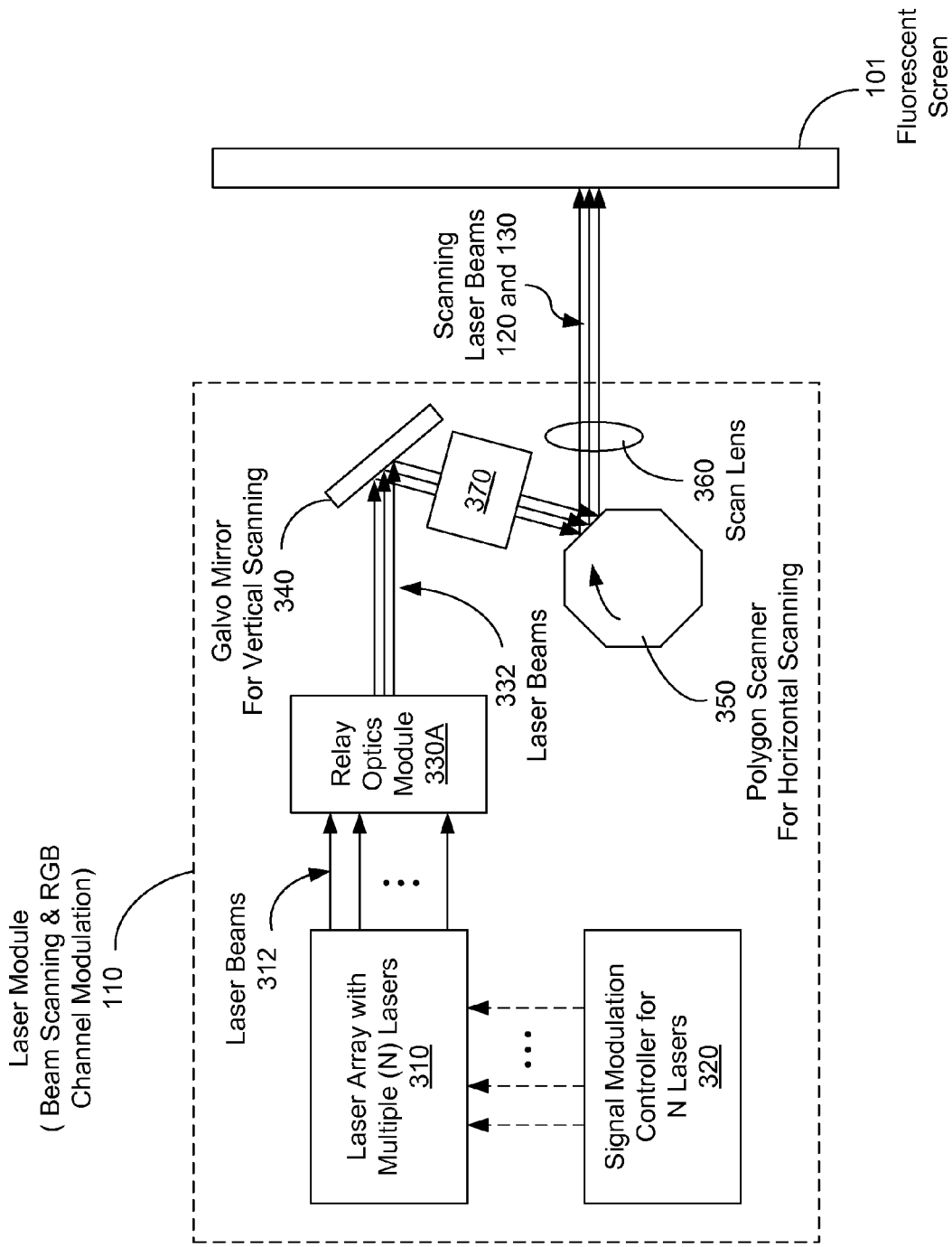
FIG. 3 shows an example implementation of the laser display system in FIG. 1 in a pre-objective scanning configuration having multiple lasers that direct multiple laser beams on the screen.

Referring now to FIG. 3, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors. A relay optics module 370 is inserted between the scanners 340 and 350 to image the reflective surface of the reflector in the vertical scanner 340 into a respective reflecting facet of the polygon scanner 350 in order to prevent beam walk across the thin facet of the polygon scanner 350 in the vertical direction.

The laser beams 120 are scanned spatially across the screen 101 to hit different color pixels at different times. Accordingly, each of the modulated beams 120 carries the image signals for the red, green and blue colors for each pixel at different times and for different pixels at different times. Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color subpixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

In the above example of a scanning beam display system shown in FIG. 3, the scan lens 360 is located downstream from the beam scanning devices 340 and 350 and focuses the one or more scanning excitation beams 120 onto the screen 101. This optical configuration is referred to as a "pre-objective" scanning system. In such a pre-objective design, a scanning beam directed into the scan lens 360 is scanned along two orthogonal directions. Therefore, the scan lens 360 is designed to focus the scanning beam onto the screen 101 along two orthogonal directions. In order to achieve the proper focusing in both orthogonal directions, the scan lens 360 can be complex and, often, are made of multiples lens elements. In one implementation, for example, the scan lens 360 can be a two-dimensional f-theta lens that is designed to have a linear relation between the location of the focal spot on the screen and the input scan angle (theta) when the input beam is scanned around each of two orthogonal axes perpendicular to the optic axis of the scan lens. The two-dimensional scan lens 360 such as a f-theta lens in the pre-objective configuration can exhibit optical distortions along the two orthogonal scanning directions which cause beam positions on the screen 101 to trace a curved line. The scan lens 360 can be designed with multiple lens elements to reduce the bow distortions and can be expensive to fabricate.

To avoid the above distortion issues associated with a two-dimensional scan lens in a pre-objective scanning beam system, a post-objective scanning beam display system can be implemented to replace the two-dimensional scan lens 360 with a simpler, less expensive 1-dimensional scan lens. U.S. patent application Ser. No. 11/742,014 entitled "POST-OBJECTIVE SCANNING BEAM SYSTEMS" and filed on Apr. 30, 2007 (U.S. Patent Publication No. 2008/0247020) describes examples of post-objective scanning beam systems suitable for use with phosphor screens described in this application and is incorporated by reference as part of the specification of this application.

Figure 4:
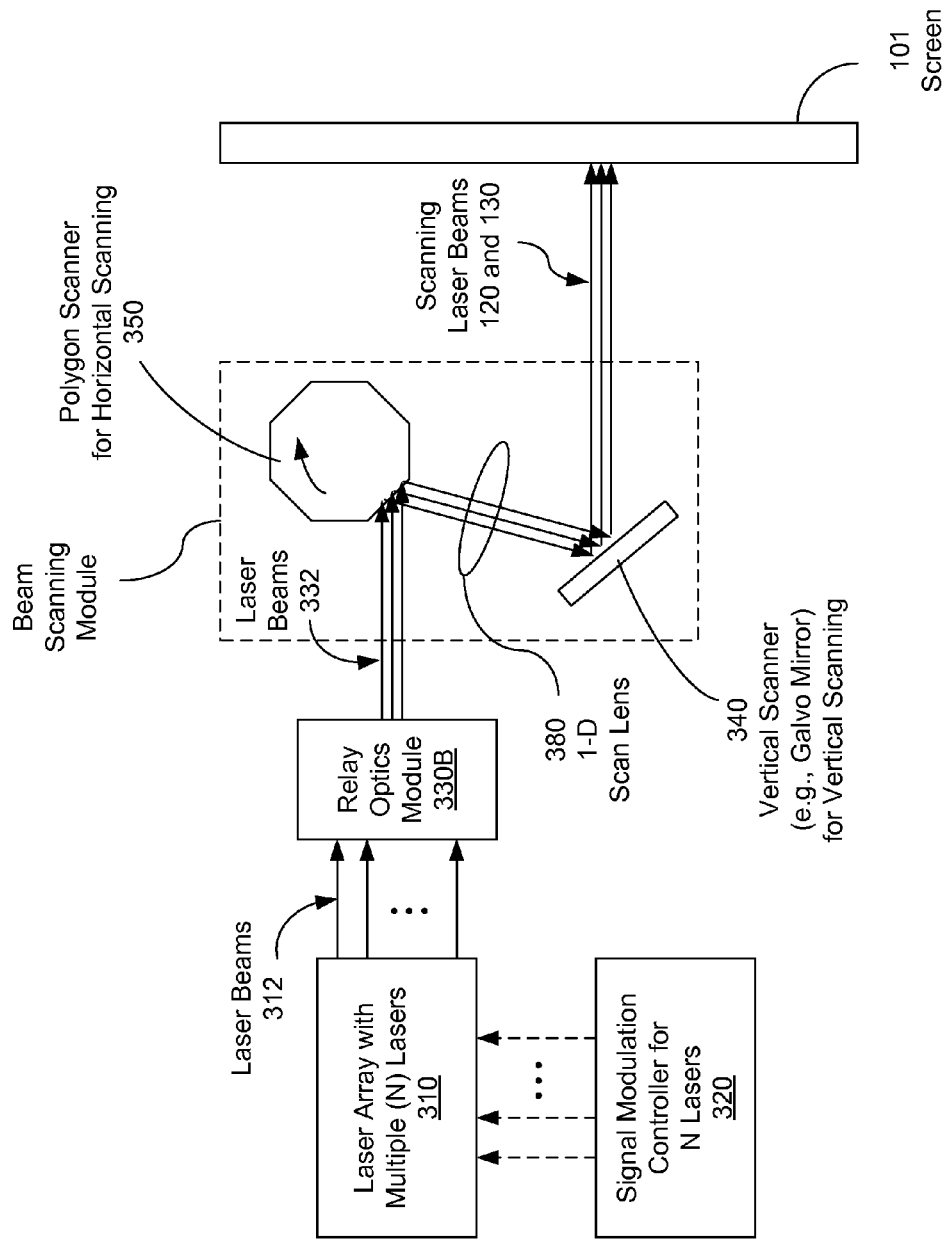
FIG. 4 shows an example implementation of a post-objective scanning beam display system based on the laser display system in FIG. 1.

FIG. 4 shows an example implementation of a post-objective scanning beam display system based on the system design in FIG. 1. A laser array 310 with multiple lasers is used to generate multiple laser beams 312 to simultaneously scan a screen 101 for enhanced display brightness. A signal modulation controller 320 is provided to control and modulate the lasers in the laser array 310 so that the laser beams 312 are modulated to carry the image to be displayed on the screen 101. The beam scanning is based on a two-scanner design with a horizontal scanner such as a polygon scanner 350 and a vertical scanner such as a galvanometer scanner 340. Each of the different reflective facets of the polygon scanner 350 simultaneously scans N horizontal lines where N is the number of lasers. A relay optics module 330 reduces the spacing of laser beams 312 to form a compact set of laser beams 332 that spread within the facet dimension of the polygon scanner 350 for the horizontal scanning. Downstream from the polygon scanner 350, there is a 1-D horizontal scan lens 380 followed by a vertical scanner 340 (e.g., a galvo mirror) that receives each horizontally scanned beam 332 from the polygon scanner 350 through the 1-D scan lens 380 and provides the vertical scan on each horizontally scanned beam 332 at the end of each horizontal scan prior to the next horizontal scan by the next facet of the polygon scanner 350. The vertical scanner 340 directs the 2-D scanning beams 390 to the screen 101.

Under this optical design of the horizontal and vertical scanning, the 1-D scan lens 380 is placed downstream from the polygon scanner 140 and upstream from the vertical scanner 340 to focus each horizontal scanned beam on the screen 101 and minimizes the horizontal bow distortion to displayed images on the screen 101 within an acceptable range, thus producing a visually "straight" horizontal scan line on the screen 101. Such a 1-D scan lens 380 capable of producing a straight horizontal scan line is relatively simpler and less expensive than a 2-D scan lens of similar performance. Downstream from the scan lens 380, the vertical scanner 340 is a flat reflector and simply reflects the beam to the screen 101 and scans vertically to place each horizontally scanned beam at different vertical positions on the screen 101 for scanning different horizontal lines. The dimension of the reflector on the vertical scanner 340 along the horizontal direction is sufficiently large to cover the spatial extent of each scanning beam coming from the polygon scanner 350 and the scan lens 380. The system in FIG. 4 is a post-objective design because the 1-D scan lens 380 is upstream from the vertical scanner 340. In this particular example, there is no lens or other focusing element downstream from the vertical scanner 340.

Notably, in the post-objective system in FIG. 4, the distance from the scan lens to a location on the screen 101 for a particular beam varies with the vertical scanning position of the vertical scanner 340. Therefore, when the 1-D scan lens 380 is designed to have a fixed focal distance along the straight horizontal line across the center of the elongated 1-D scan lens, the focal properties of each beam must change with the vertical scanning position of the vertical scanner 380 to maintain consistent beam focusing on the screen 101. In this regard, a dynamic focusing mechanism can be implemented to adjust convergence of the beam going into the 1-D scan lens 380 based on the vertical scanning position of the vertical scanner 340.

For example, in the optical path of the one or more laser beams from the lasers to the polygon scanner 350, a stationary lens and a dynamic refocus lens can be used as the dynamic focusing mechanism. Each beam is focused by the dynamic focus lens at a location upstream from the stationary lens. When the focal point of the lens coincides with the focal point of the lens, the output light from the lens is collimated. Depending on the direction and amount of the deviation between the focal points of the lenses, the output light from the collimator lens toward the polygon scanner 350 can be either divergent or convergent. Hence, as the relative positions of the two lenses along their optic axis are adjusted, the focus of the scanned light on the screen 101 can be adjusted. A refocusing lens actuator can be used to adjust the relative position between the lenses in response to a control signal. In this particular example, the refocusing lens actuator is used to adjust the convergence of the beam directed into the 1-D scan lens 380 along the optical path from the polygon scanner 350 in synchronization with the vertical scanning of the vertical scanner 340. The vertical scanner 340 in FIG. 4 scans at a much smaller rate than the scan rate of the first horizontal scanner 350 and thus a focusing variation caused by the vertical scanning on the screen 101 varies with time at the slower vertical scanning rate. This allows a focusing adjustment mechanism to be implemented in the system of FIG. 1 with the lower limit of a response speed at the slower vertical scanning rate rather than the high horizontal scanning rate.

The beams 120 on the screen 101 are located at different and adjacent vertical positions with two adjacent beams being spaced from each other on the screen 101 by one horizontal line of the screen 101 along the vertical direction. For a given position of the galvo mirror 540 and a given position of the polygon scanner 550, the beams 120 may not be aligned with each other along the vertical direction on the screen 101 and may be at different positions on the screen 101 along the horizontal direction. The beams 120 can cover one portion of the screen 101. At a fixed angular position of the galvo mirror 540, the spinning of the polygon scanner 550 causes the beams 120 from N lasers in the laser array 510 to scan one screen segment of N adjacent horizontal lines on the screen 101. At the end of each horizontal scan, the galvo mirror 540 is adjusted to a different fixed angular position so that the vertical positions of all N beams 120 are adjusted to scan the next adjacent screen segment of N horizontal lines. This process iterates until the entire screen 101 is scanned to produce a full screen display.

Figure 5:
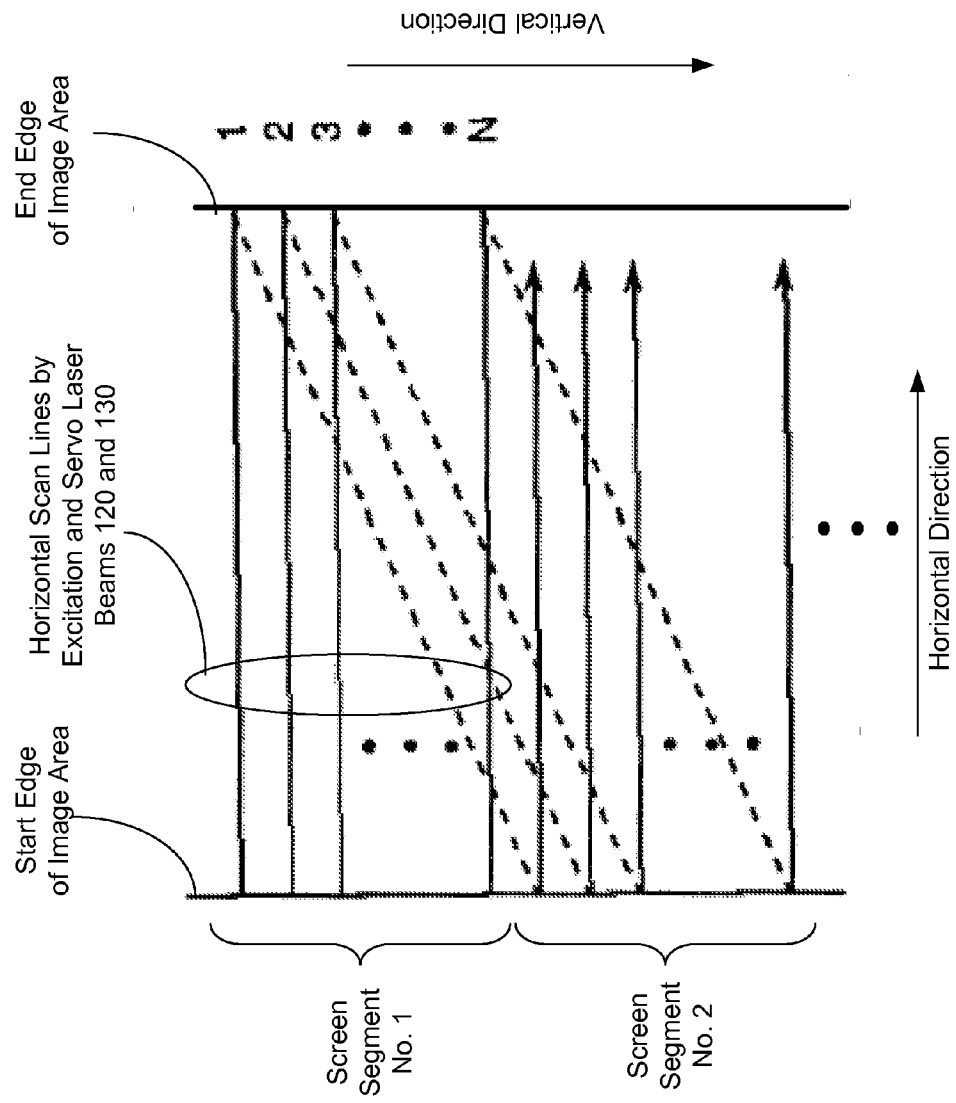
FIG. 5 shows one example for simultaneously scanning consecutive scan lines with multiple excitation laser beams and an invisible servo beam.

FIG. 5 illustrates the above simultaneous scanning of one screen segment with multiple scanning laser beams 120 at a time. Visually, the beams 120 behaves like a paint brush to "paint" one thick horizontal stroke across the screen 101 at a time to cover one screen segment between the start edge and the end edge of the image area of the screen 101 and then subsequently to "paint" another thick horizontal stroke to cover an adjacent vertically shifted screen segment. Assuming the laser array 310 has 36 lasers, a 1080-line progressive scan of the screen 101 would require scanning 30 vertical screen segments for a full scan. Hence, this configuration in an effect divides the screen 101 along the vertical direction into multiple screen segments so that the N scanning beams scan one screen segment at a time with each scanning beam scanning only one line in the screen segment and different beams scanning different sequential lines in that screen segment. After one screen segment is scanned, the N scanning beams are moved at the same time to scan the next adjacent screen segment.

In the above design with multiple laser beams, each scanning laser beam 120 scans only a number of lines across the entire screen along the vertical direction that is equal to the number of screen segments. Hence, the polygon scanner 550 for the horizontal scanning can operate at slower speeds than scanning speeds required for a single beam design where the single beam scans every line of the entire screen. For a given number of total horizontal lines on the screen (e.g., 1080 lines in HDTV), the number of screen segments decreases as the number of the lasers increases. Hence, with 36 lasers, the galvo mirror and the polygon scanner scan 30 lines per frame while a total of 108 lines per frame are scanned when there are only 10 lasers. Therefore, the use of the multiple lasers can increase the image brightness which is approximately proportional to the number of lasers used, and, at the same time, can also advantageously reduce the response speeds of the scanning system.

A scanning display system described in this specification can be calibrated during the manufacture process so that the laser beam on-off timing and position of the laser beam relative to the fluorescent stripes in the screen 101 are known and are controlled within a permissible tolerance margin in order for the system to properly operate with specified image quality. However, the screen 101 and components in the laser module 101 of the system can change over time due to various factors, such as scanning device jitter, changes in temperature or humidity, changes in orientation of the system relative to gravity, settling due to vibration, aging and others. Such changes can affect the positioning of the laser source relative to the screen 101 over time and thus the factory-set alignment can be altered due to such changes. Notably, such changes can produce visible and, often undesirable, effects on the displayed images. For example, a laser pulse in the scanning excitation beam 120 may hit a subpixel that is adjacent to an intended target subpixel for that laser pulse due to a misalignment of the scanning beam 120 relative to the screen along the horizontal scanning direction. When this occurs, the coloring of the displayed image is changed from the intended coloring of the image. Hence, a red pixel in the intended image may be displayed as a green pixel on the screen. For another example, a laser pulse in the scanning excitation beam 120 may hit both the intended target subpixel and an adjacent subpixel next to the intended target subpixel due to a misalignment of the scanning beam 120 relative to the screen along the horizontal scanning direction. When this occurs, the coloring of the displayed image is changed from the intended coloring of the image and the image resolution deteriorates. The visible effects of these changes can increase as the screen display resolution increases because a smaller pixel means a smaller tolerance for a change in position. In addition, as the size of the screen increases, the effect of a change that can affect the alignment can be more pronounced because a large moment arm in scanning each excitation beam 120 associated with a large screen means that an angular error can lead to a large position error on the screen. For example, if the laser beam position on the screen for a known beam angle changes over time, the result is a color shift in the image. This effect can be noticeable and thus undesirable to the viewer.

Implementations of various alignment mechanisms are provided in this specification to maintain proper alignment of the scanning beam 120 on the desired sub-pixel to achieved desired image quality. These alignment mechanisms include reference marks on the screen, both in the fluorescent area and in one or more peripheral area outside the fluorescent area, to provide feedback light that is caused by the excitation beam 120 and represents the position and other properties of the scanning beam on the screen. The feedback light can be measured by using one or more optical servo sensors to produce a feedback servo signal. A servo control in the laser module 110 processes this feedback servo signal to extract the information on the beam positioning and other properties of the beam on the screen and, in response, adjust the direction and other properties of the scanning beam 120 to ensure the proper operation of the display system.

For example, a feedback servo control system can be provided to use peripheral servo reference marks positioned outside the display area unobservable by the viewer to provide control over various beam properties, such as the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. For another example, a screen calibration procedure can be performed at the startup of the display system to measure the beam position information as a calibration map so having the exact positions of sub-pixels on the screen in the time domain. This calibration map is then used by the laser module 110 to control the timing and positioning of the scanning beam 120 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer.

Referring to FIG. 1, the laser module 110 also produces an invisible servo beam 130 such as an IR beam and scans the servo beam 130 on to the screen 101 along with the excitation beam 120. Different from the excitation beam 120, the servo beam 130 is not modulated to carry image data. The servo beam 130 can be a CW beam. The stripe dividers on the screen 101 can be made reflective to the light of the servo beam 130 and to produce feedback light 132 by reflection. The servo beam 130 has a known spatial relation with the excitation beam 120. Therefore, the positioning of the servo beam 130 can be used to determine the positioning of the excitation beam 120. This relationship between the servo beam and excitation beams can be determined by using reference servo marks such as a start of line mark in a non-viewing area of the screen 101. The laser module 101 receives and detects the feedback light 132 to obtain positioning information of the servo beam 130 on the screen 101 and use this positioning information to control alignment of the excitation beam 120 on the screen. The servo beam 130 is invisible and does not produce any noticeable visual artifact on the screen 101 during the normal operation of the system when images are produced on the screen 101. For example, the servo beam 130 can have a wavelength in a range from 780 nm to 820 nm. For safety concerns, the screen 101 can be made to have a filter that blocks the invisible servo beam 130 from exiting the screen 101 on the viewer side. In this regard, a cutoff absorbing filter with a bandpass transmission range only in the visible spectral range (e.g., from 420 nm to 680 nm) may be used to block the servo beam 130 and excitation beam 120. The servo control of the excitation beam 120 based on the servo beam 130 can be performed dynamically during the normal operation of the system. This servo design avoids manipulation of the image-producing excitation beam 120 during the normal display mode for servo operations and thus avoids any visual artifacts that may be caused by the servo-related manipulation of the image-producing excitation beam 120.

In addition, the scattered or reflected excitation light by the screen 101 may also be used for servo control operations during a period when the system does not show images, e.g., during the startup period of the system or when the excitation beam 120 is outside the active display area of the screen 101. In such a case, the scattered or reflected excitation light, labeled as light 122, can be used as servo feedback light for servo control of the horizontal alignment of each laser.

In the examples of the systems in FIGS. 3 and 4, the servo beam 130 is directed along with the one or more excitation beams 120 through the same optical path that includes the relay optics module 330A or 330B, the beam scanners 340 and 350, and the scan lens 360 or 380. Referring to FIG. 5, the servo beam 130 is scanned along with the scanning excitation beams 120 one screen segment at a time along the vertical direction of the screen. The servo beam 130 is invisible and can be overlapped with a scanning path of one excitation beam 120 or along its own scanning path that is different from a path of any of the excitation beams 120. The spatial relation between the servo beam 130 and each excitation beam 120 is known and fixed so that the positioning of the servo beam 130 on the screen 101 can be used to infer positioning of each excitation beam 120.

A light source for generating the servo beam 130 and a light source for generating an excitation beam 120 can be semiconductor lasers in a light source module which can be an array of lasers and at least one of the lasers in the laser array can be a servo laser that produces the servo beam 130. The location of the servo laser is known relative to each excitation laser. The servo beam 130 and each excitation beam 120 are directed through the same relay optics, the same beam scanners and the same projection lens and are projected on the screen 101. Therefore, the positioning of the servo beam 130 on the screen 101 has a known relation with the positioning of each excitation beam 120 on the screen. This relation between the servo beam 130 and each excitation beam 120 can be used to control the excitation beam 120 based on measured positioning of the servo beam 130.

FIG. 5A shows a map of beam positions on the screen produced by a laser array of thirty-six excitation lasers and one IR servo laser when a vertical galvo scanner and a horizontal polygon scanner are at their respective null positions in a prototype pre-objective scanning display system. The thirty-six excitation lasers are arranged in a 4×9 laser array and the IR servo laser is placed in the center of the laser array. The laser beams occupy an area of about 20 mm×25 mm on the screen. In this example, the vertical spacing is one half of a pixel between two vertically adjacent excitation lasers and the horizontal spacing between two adjacent excitation lasers is 3.54 pixels. Because the excitation lasers are spatially staggered along both horizontal and vertical directions, each scan in one screen segment produces thirty-six horizontal lines on the screen occupying thirty-six pixels along the vertical direction. In operation, these thirty-seven laser beams are scanned together based on the scanning shown in FIG. 5 to scan one screen segment at a time to sequentially scan different screen segments at different vertical positions to scan the entire screen. Because the IR servo laser is fixed in position with respect to each and every one of the thirty-six excitation lasers, the positioning of the servo beam 130 produced by the IR servo laser on the screen 101 has a known relation with respect to each beam spot of an excitation beam 120 from each of the thirty-six excitation lasers.

Figure 6:
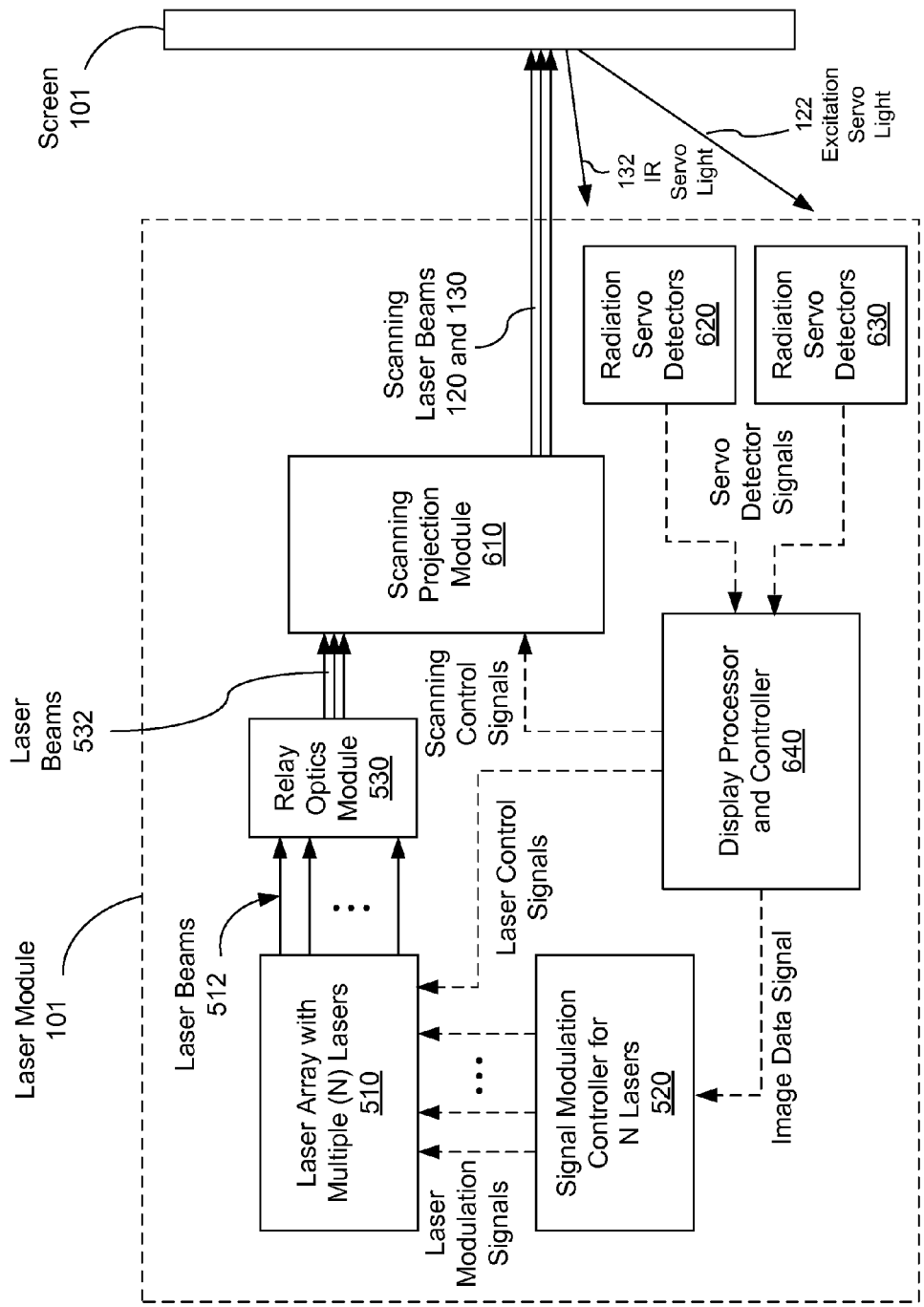
FIG. 6 shows one example of a scanning display system using a servo feedback control based on a scanning servo beam.

FIG. 6 illustrates a scanning beam display system based on a servo control using the invisible servo beam 130. A display processor and controller 640 can be used to provide control functions and control intelligence based on servo detector signals from radiation servo detectors 620 that detect servo feedback light 132 from the screen 101. A single detector 620 may be sufficient and two or more servo detectors 620 can be used to improve the servo detection sensitivity. Similarly, one or more radiation servo detectors 630 may also be used to collect excitation servo light 122 produced by scattering or reflecting the excitation beam 120 at the screen to provide additional feedback signals to the processor and controller 640 for the servo control. A scanning projection module 610 is provided to scan and project the excitation and servo beams 120 and 130 onto the screen. The module 610 can be in a post-objective configuration or a pre-objective configuration. As illustrated, the image data is fed to the display processor and controller 640 which produces an image data signal carrying the image data to the signal modulator controller 520 for the excitation lasers 510. The servo laser which is among the excitation lasers in the array 510 is not modulated to carry image data. The signal modulation controller 520 can include laser driver circuits that produce laser modulation signals carrying image signals with image data assigned to different lasers 510, respectively. The laser control signals are then applied to modulate the lasers in the laser array 510, e.g., the currents for laser diodes to produce the laser beams 512. The display processor and controller 640 also produces laser control signals to the lasers in the laser array 510 to adjust the laser orientation to change the vertical beam position on the screen 101 or the DC power level of each laser. The display processor and controller 5930 further produces scanning control signals to the scanning projection module 610 to control and synchronize the horizontal polygon scanner and the vertical scanner.

Figure 7:
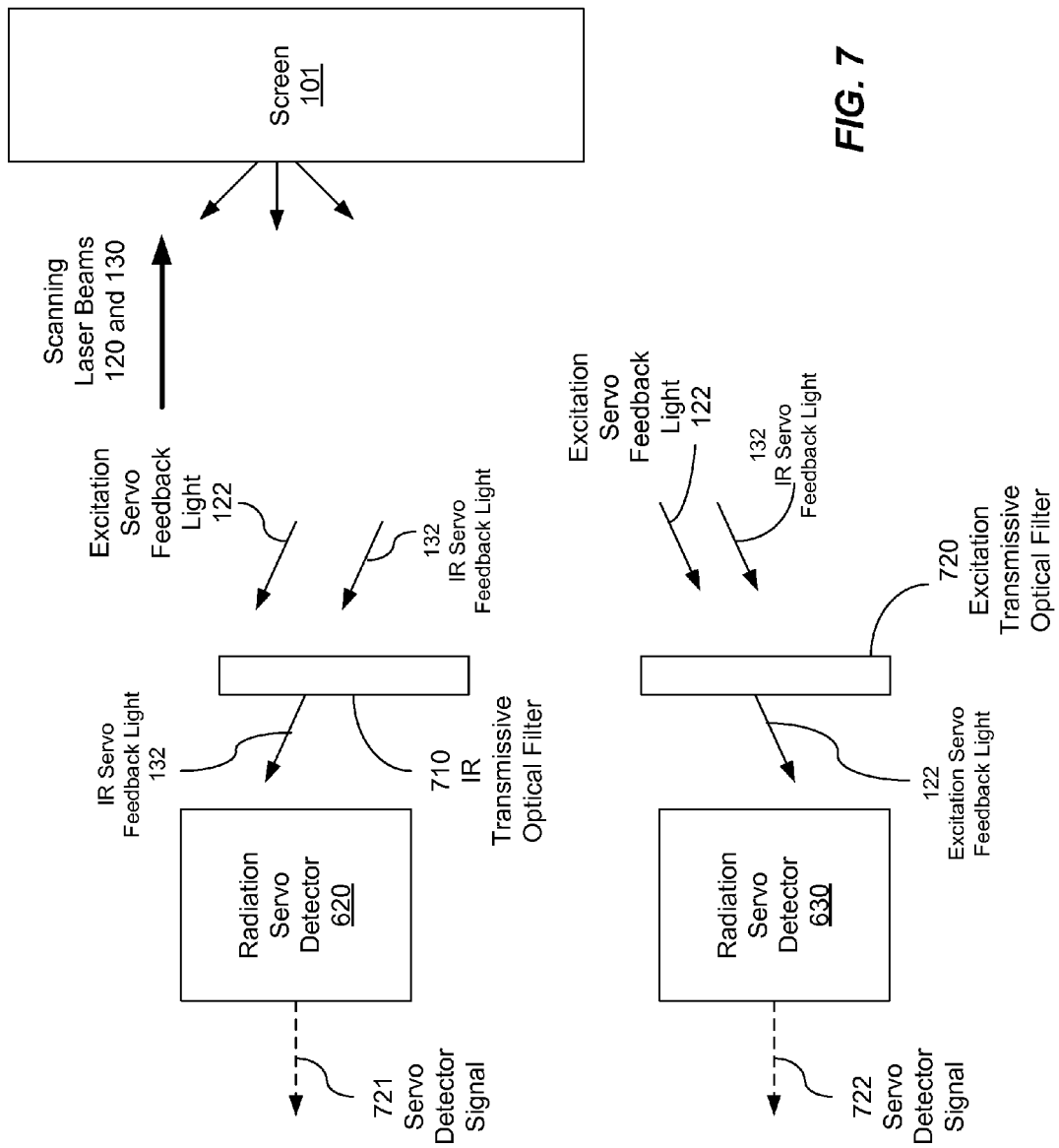
FIG. 7 shows an example of a servo detector for detecting the servo feedback light in FIG. 6.

FIG. 7 shows one example of the servo detector design where a servo detector 620 detects the servo feedback light 132. The servo detector 620 can be a detector designed to be sensitive to light of the servo beam wavelength and less sensitive to visible light. An optical filter 710 can be used to filter the light from the screen 101 to selectively transmit the servo feedback light 132 while blocking light at other wavelengths, such as the excitation light and visible light. Such a filter allows a wider range of optical detectors to be used as the servo detector. FIG. 7 also shows an example of a servo detector 630 for detecting the servo feedback light 122 at the excitation wavelength. The servo detector 620 can be a detector designed to be sensitive to light of the excitation wavelength of the excitation beam 120 and less sensitive to light at wavelengths of the servo beam 130 and the visible light emitted by the screen 101. An optical filter 720 can be used to filter the light from the screen 101 to selectively transmit the excitation servo feedback light 122 while blocking light at other wavelengths. The servo detector signals 721 and 722 from the servo detectors 620 and 630, respectively, are directed to the processor and controller 640 for servo control operations.

Figure 8:
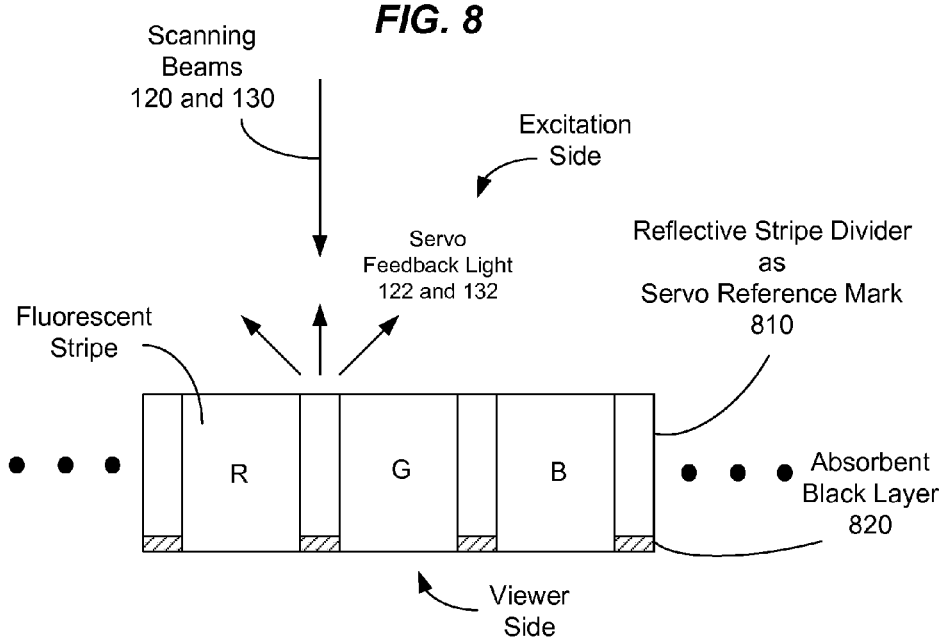
FIGS. 8 and 9 show two screen examples for the servo control based on a scanning servo beam.
Figure 9:
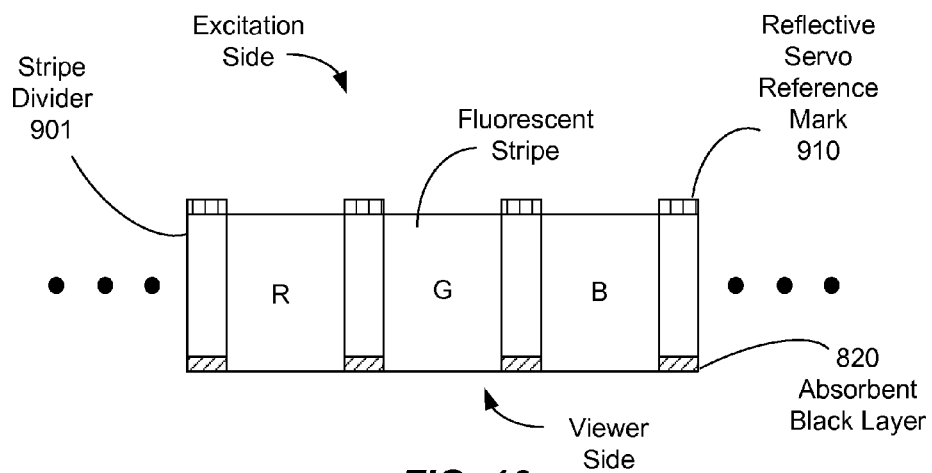

FIGS. 8 and 9 show two exemplary screen designs for the screen 101 for providing the feedback light 122 and 132. In FIG. 8, each strip divider 810 is made optically reflective to the servo and excitation beams so the reflection can be used as the feedback light 132. The strip divider 810 can also be made reflective and opaque to light to optically isolate adjacent light-emitting stripes to enhance contrast and to reduce cross talk. The light-emitting stripes such phosphor stripes emitting red, green and blue light are less reflective to the servo and excitation beams than the stripe dividers 810 so that the feedback light 132 exhibits a spike every time the servo or excitation beams 130 pass through a stripe divider 810. An absorbent black layer 820 can be coated on each stripe divider on the viewer side to reduce glare of ambient light to the viewer. FIG. 9 shows another screen design where a reflective servo reference mark 910 is formed on the excitation side of each strip divider 901, e.g., a reflective stripe coating.

In each horizontal scan, the beam 120 or 130 scans across the light-emitting stripes and the reflections produced by the stripe dividers can be used to indicate horizontal positions of the stripe dividers, spacing between two adjacent stripe dividers and horizontal positions of the horizontally scanned beam 120 or 130. Therefore, reflections from the stripe dividers can be used for servo control of the horizontal alignment between the beam 120 and the light-emitting strips.

Figure 10:
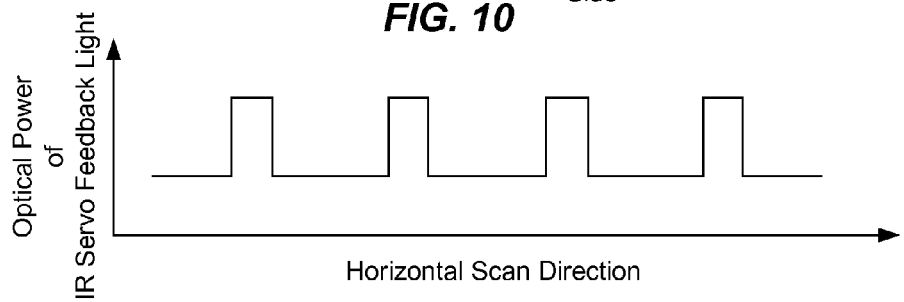
FIG. 10 shows optical power of servo light having optical signals corresponding to stripe dividers on the screen.

FIG. 10 shows operation of the stripe dividers as alignment reference marks. As the servo beam 120 or 130 is scanned horizontally across the screen 101 and the light at the servo beam shows a low power when the servo beam 130 is at a light-emitting stripe and a high power when the servo beam is at a stripe divider. When the beam spot of the servo beam 130 on the screen 101 is less than the width of one subpixel, the power of the servo light shows a periodic pattern in each horizontal scan where the high power peak corresponds to a stripe divider. This pattern can be used to measure the position of the stripe dividers or the width of each stripe divider based on clock cycles of a clocking signal in the processor and controller 640. This measured information is used to update a positioning map of each excitation beam 120 in the horizontal scan. When the beam spot of the servo beam 130 is greater than one width of the subpixel but is less than one color pixel made up by three adjacent subpixels, the power of the servo light 132 still shows a periodic pattern in each horizontal scan where the high power peak corresponds to one color pixel and thus can be used for servo control.

In addition to the stripe dividers as alignment reference marks on the screen 101, additional alignment reference marks can be implemented to determine the relative position of the beam and the screen and other parameters of the excitation beam on the screen. For example, during a horizontal scan of the excitation and servo beams across the light-emitting stripes, a start of line mark can be provided for the system to determine the beginning of the active light-emitting display area of the screen 101 so that the signal modulation controller of the system can properly control the timing in delivering optical pulses to targeted pixels. An end of line mark can also be provided for the system to determine the end of the active light-emitting display area of the screen 101 during a horizontal scan. For another example, a vertical alignment referenced mark can be provided for the system to determine whether the scanning beams are pointed to a proper vertical location on the screen. Other examples for reference marks may be one or more reference marks for measuring the beam spot size on the screen and one or more reference marks on the screen to measure the optical power of the excitation beam 120. Such reference marks can be placed a region outside the active fluorescent area of the screen 101, e.g., in one or more peripheral regions of the active fluorescent screen area and are used for both excitation and servo beams.

Figure 11:
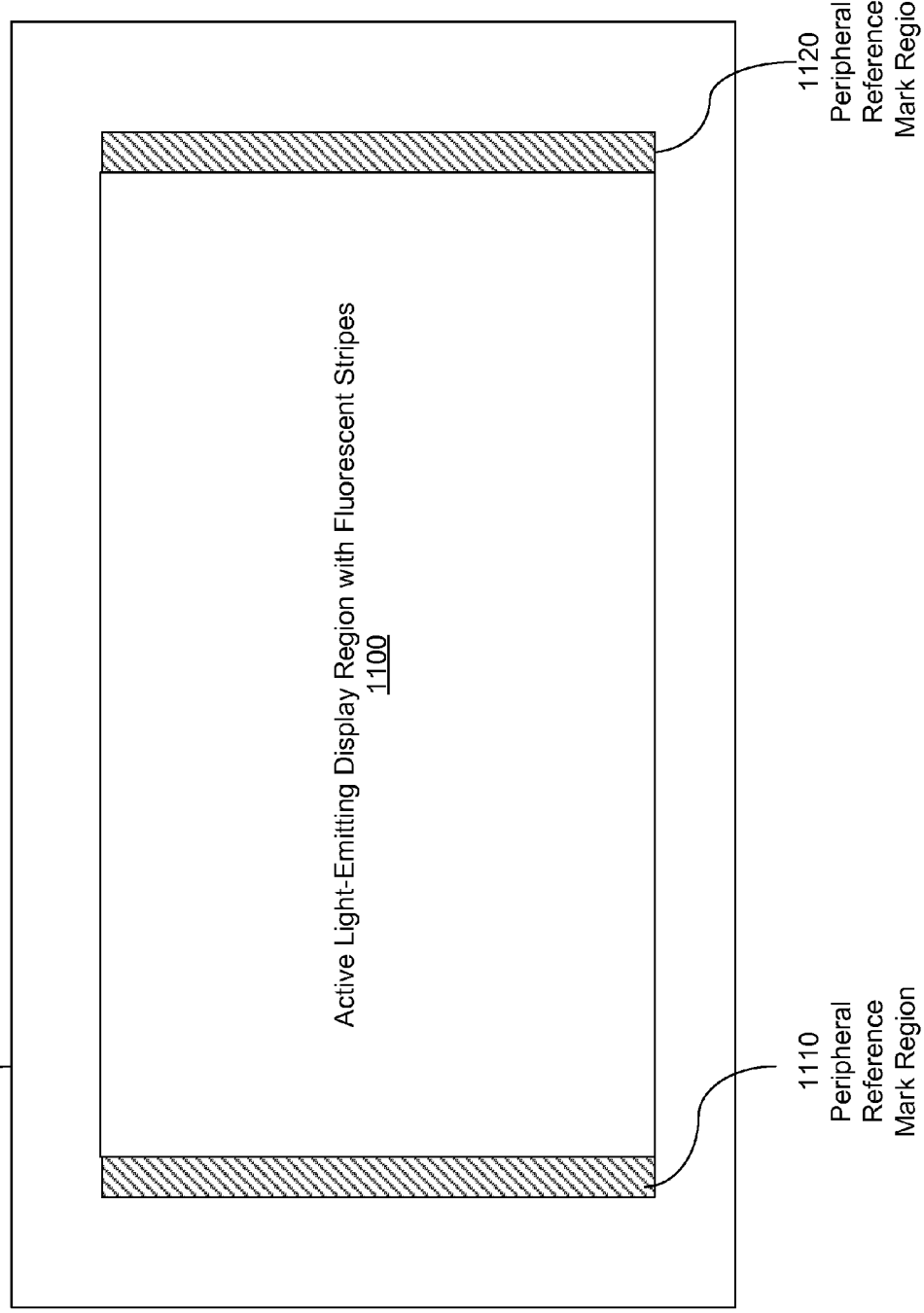
FIG. 11 shows an example of a screen having peripheral reference mark regions that include servo reference marks that produce feedback light for various servo control functions.

FIG. 11 illustrates one example of a fluorescent screen 101 having peripheral reference mark regions. The screen 101 includes a central active light-emitting display area 1100 with parallel fluorescent stripes for displaying images, two stripe peripheral reference mark regions 1110 and 1120 that are parallel to the fluorescent stripes. Each peripheral reference mark region can be used to provide various reference marks for the screen 101. In some implementations, only the left peripheral reference mark region 1110 is provided without the second region 1120 when the horizontal scan across the fluorescent stripes is directed from the left to the right of the area 1100.

Such a peripheral reference mark region on the screen 101 allows the scanning display system to monitor certain operating parameters of the system. Notably, because a reference mark in the peripheral reference mark region is outside the active display area 1100 of the screen 101, a corresponding servo feedback control function can be performed outside the duration during the display operation when the excitation beam is scanning through the active fluorescent display area 2600 to display image. Therefore, a dynamic servo operation can be implemented without interfering with the display of the images to the viewer. In this regard, each scan can include a CW mode period when an excitation beam sans through the peripheral referenced mark region for the dynamic servo sensing and control and a display mode period when the modulation of the excitation beam is turned on to produce image-carrying optical pulses as the excitation beam sans through the active fluorescent display area 1100. The servo beam 130 is not modulated to carry image data and thus can be a CW beam with a constant beam power when incident onto the screen 101. The power of the reflected servo light in the feedback light 132 is modulated by the reference marks and stripe dividers and other screen pattern on the screen 101. The modulated power of the reflected servo light can be used to measure the location of the servo beam 130 on the screen 101.

Figure 12:
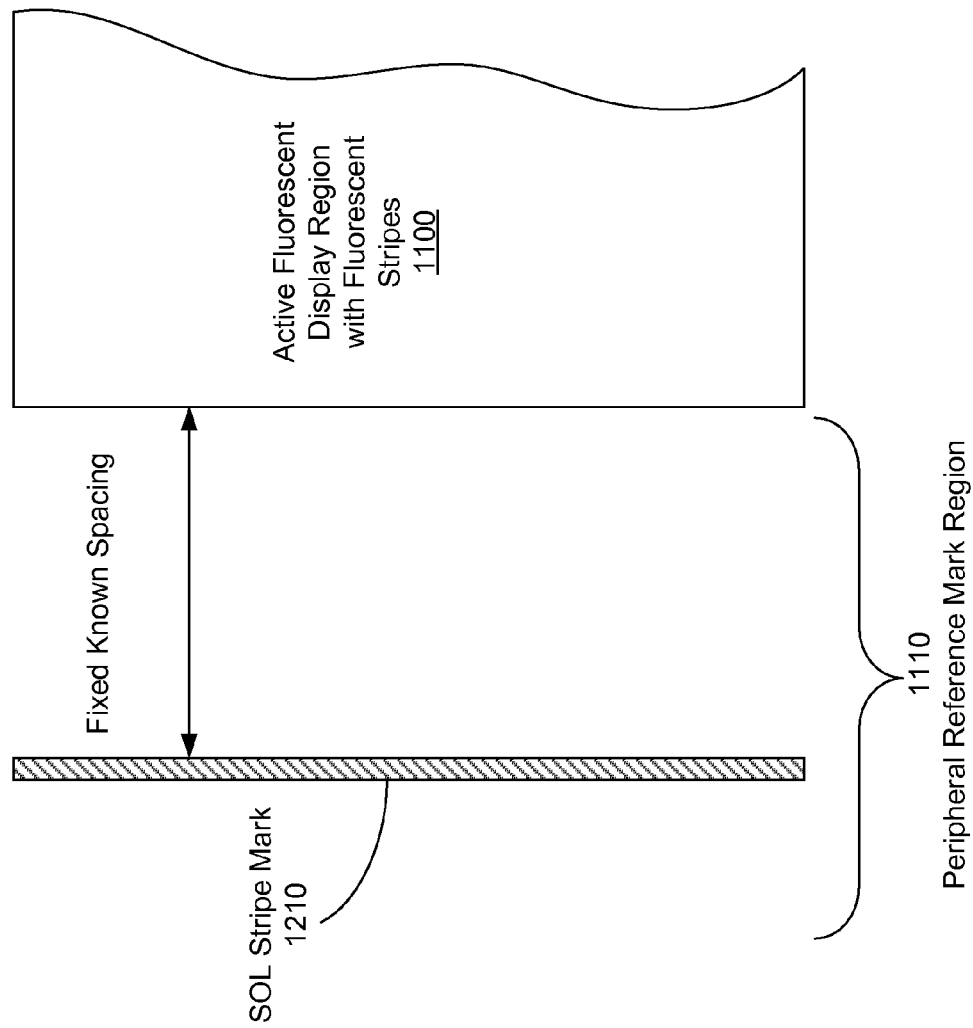
FIG. 12 shows a start of line reference mark in a peripheral reference mark region to provide a reference for the beginning of the active fluorescent area on the screen.

FIG. 12 shows an example of a start of line (SOL) reference mark 1210 in the left peripheral region 1110 in the screen 101. The SOL reference mark 1210 can be an optically reflective, diffusive or fluorescent stripe parallel to the fluorescent stripes in the active light-emitting region 1100 of the screen 101. The SOL reference mark 1210 is fixed at a position with a known distance from the first fluorescent stripe in the region 1100. SOL patterns may be a single reflective stripe in some implementations and may include multiple vertical lines with uniform or variable spacing in other implementations. Multiple lines are selected for redundancy, increasing the signal to noise ratio, accuracy of position (time) measurement, and providing missing pulse detection.

In operation, the scanning excitation beam 120 is scanned from the left to the right in the screen 101 by first scanning through the peripheral reference mark region 1110 and then through the active region 1100. When the beam 120 is in the peripheral reference mark region 1110, the signal modulation controller in the laser module 110 of the system sets the beam 120 in a mode that ensures adequate sampling of information without crosstalk (e.g. one beam at a time during one frame) When the scanning excitation beam 120 scans through the SOL reference mark 1210, the light reflected, scattered or emitted by the SOL reference mark 1210 due to the illumination by the excitation beam 1210 can be measured at an SOL optical detector located near the SOL reference mark 1210. The presence of this signal indicates the location of the beam 120. The SOL optical detector can be fixed at a location in the region 1110 on the screen 101 or off the screen 101. Therefore, the SOL reference mark 1210 can be used to allow for periodic alignment adjustment during the lifetime of the system.

When the pulse from the SOL 1210 detected is detected for a given excitation beam, the laser can be controlled to, after the delay representing the time for scanning the beam from the SOL 1210 to the left edge of the active display area 1100, operate in the image mode and carry optical pulses with imaging data. The system then recalls a previously measured value for the delay from SOL pulse to beginning of the image area 1100. This process can be implemented in each horizontal scan to ensure that each horizontal line starts the image area properly and optical pulses in each horizontal scan are aligned to the light-emitting stripes. The correction is made prior to painting the image for that line in the area 1100 on the screen 101, so there is no time lag in displaying the images caused by the servo control. This allows for both high frequency (up to line scan rate) and low frequency errors to be corrected.

The servo beam 130 can be used to provide a positioning reference for each excitation beam 120 for controlling both the timing for beginning image-carrying pulses before the excitation beam enters the active light-emitting area 1100 and during the normal display when the excitation beam 120 scans in the active light-emitting region 1100. FIG. 13 illustrates the detected signal power of the light at the servo beam wavelength in the feedback light 132 to show optical signals indicative of positions of the SOL mark and stripe dividers on the screen 101. The optical peaks in the feedback light shown in FIGS. 13 and 14 are idealized as sharp square wave signals and are likely to have tailing and leading profiles shown in FIGS. 15-16. Such a pulse signal with trailing and leading profiles can be converted into square wave like pulse signals by edge detection.

Similar to the SOL mark 1210, an end-of-line (EOL) reference mark can be implemented on the opposite side of the screen 101, e.g., in the peripheral reference mark region 1120 in FIG. 11. The SOL mark is used to ensure the proper alignment of the laser beam with the beginning of the image area. This does not ensure the proper alignment during the entire horizontal scan because the position errors can be present across the screen. Implementing the EOL reference mark and an end-of-line optical detector in the region 1120 can be used to provide a linear, two point correction of laser beam position across the image area. FIG. 14 illustrates the detected signal power of the light at the serve beam wavelength in the feedback light 132 to show optical signals indicative of positions of the SOL mark, stripe dividers and EOL mark on the screen 101

When both SOL and EOL marks are implemented, the laser is turned on continuously in a continuous wave (CW) mode prior to reaching the EOL sensor area. Once the EOL signal is detected, the laser can be returned to image mode and timing (or scan speed) correction calculations are made based on the time difference between the SOL and EOL pulses. These corrections are applied to the next one or more lines. Multiple lines of SOL to EOL time measurements can be averaged to reduce noise.

Based on the stripe divider and SOL/EOL peripheral reference marks, the positioning of the servo beam 130 on the screen 101 can be measured. Because the servo beam 130 has a fixed relation with each excitation beam 120, any error in the positioning of the servo beam 130 suggests an corresponding error in each excitation beam 120. Therefore, the positioning information of the servo beam 130 can be used in the servo control to control the servo beam 130 and each excitation beam 120 to reduce an alignment error of the excitation beam.

The present servo control operates to place each optical pulse in the excitation beam 120 near or at the center of a target light-emitting stripe to excite the light-emitting material in that stripe without spilling over to an adjacent light-emitting stripe. The servo control can be designed to achieve such alignment control by controlling the timing of each optical pulse in order to place the pulse at a desired position on the screen 101 during a horizontal scan. Accordingly, the servo control, i.e., the processor and controller 640, needs to "know" horizontal positions of the light-emitting stripes in each horizontal line before each horizontal scan in order to control the timing of optical pulses during the scan. This information on horizontal positions of the light-emitting stripes in each horizontal line constitutes a two-dimensional position "map" of the active display area or light-emitting area of the screen 101 of (x, y) coordinates where x is the horizontal position of each stripe divider (or equivalently, the horizontal position of the center of each stripe) and y is the vertical position or ID number of a horizontal scan. This position map of the screen 101 can be measured at the factory and may change in time due to changes in the system components due to temperature, aging and other factors. For example, thermal expansion effects, and distortions in the optical imaging system will need corresponding adjustments in the precise timing to activate each color in a pixel. If the laser actuation does not properly correspond to the timing where the beam is directed at the central portion of a sub-pixel or stripe for the intended phosphor, the beam 120 will either partially or completely activate the wrong color phosphor. In addition, this position map of the screen 101 can vary from one system to another due to the component and device tolerances during the manufacturing.

Therefore, it is desirable to update the position map of the screen 101 and to use the updated position map for controlling the timing of pulses of the excitation beam 120 in each horizontal scan during the normal display. The position map of the screen 101 can be obtained using the feedback light 122 and 132 in a calibration scanning when the system is not in the normal display mode, e.g., during the start-up phase of the system. In addition, the servo feedback light 132 can be used in real time video display to monitor and measure changes in an existing position map of the screen 101 when the system is operating in the normal display mode to produce images on the screen 101. This mode of the servo control is referred to as dynamic servo. The dynamic monitoring of the screen 101 can be useful when the system operates for an extended period time without a downtime because the screen 101 may undergo changes that can lead to significant changes to the position map of the screen 101 that is updated during the start-up phase of the system.

The position map of the screen 101 can be stored in the memory of the laser module 110 and reused for an interval of time if the effects that are being compensated for do not change significantly. In one implementation, when the display system is turned on, the display system can be configured to, as a default, set the timing of the laser pulses of the scanning laser beam based on the data in the stored position map. The servo control can operate to provide the real-time monitoring using the servo feedback light 132 and to control the pulse timing during the operation.

In another implementation, when the display system is turned on, the display system can be configured to, as a default, to perform a calibration using the excitation beam 120 and the servo beam 130 to scan through the entire screen 101. The measured position data are used to update the position map of the screen 101. After this initial calibration during the start-up phase, the system can be switched into the normal display mode and, subsequently during the normal display operation, only the servo beam 130 is used to monitor the screen 101 and the data on the screen 101 obtained from the servo beam 130 can be used to dynamically update the position map and thus to control the timing of pulses in the beam 120 in each horizontal scan.

The calibration of the position map of the screen 101 can be obtained by operating each scanning beam 120 or 130 in a continuous wave (CW) mode for one frame during which the scanning laser beams 120 and 130 simultaneously scan through the entire screen, one segment at a time as shown in FIG. 5, when multiple laser beams 120 are used. If a single laser is used to produce one excitation beam 120, the single scanning beam 120 is set in the CW mode to scan the entire screen 101, one line at a time, along with the servo beam 130. The feedback light 122 and 132 from the servo reference marks on the stripe dividers is used to measure the laser position on the screen 101 by using the servo detectors 620 and 630.

The servo detector signals from the servo detectors 620 and 630 can be sent through an electronic "peak" detector that creates an electronic pulse whenever a servo signal is at its highest relative amplitude. The time between these pulses can be measured by a sampling clock in a digital circuit or microcontroller that is used by the processor and controller 640 to process and generate an error signal for controlling timing of optical pulses in each excitation beam 120 in a horizontal scan. Because the scan speed of the scanning beam 120 or 130 on the screen 101 is known, the time between two adjacent pulses from the electronic peak detector can be used to determine the spacing of the two locations that produce the two adjacent electronic pulses. This spacing can be used to determine the subpixel width and subpixel position. Depending on the beam scan rate and the frequency of the sampling clock, there are some nominal number of clocks for each sub-pixel. Due to optical distortions, screen defects or combination of the distortions and defects, the number of clock cycles between two adjacent pulses for any given sub-pixel may vary from the nominal number of clock cycles. This variation in clock cycles can be encoded and stored in memory for each sub-pixel.

Figure 15:
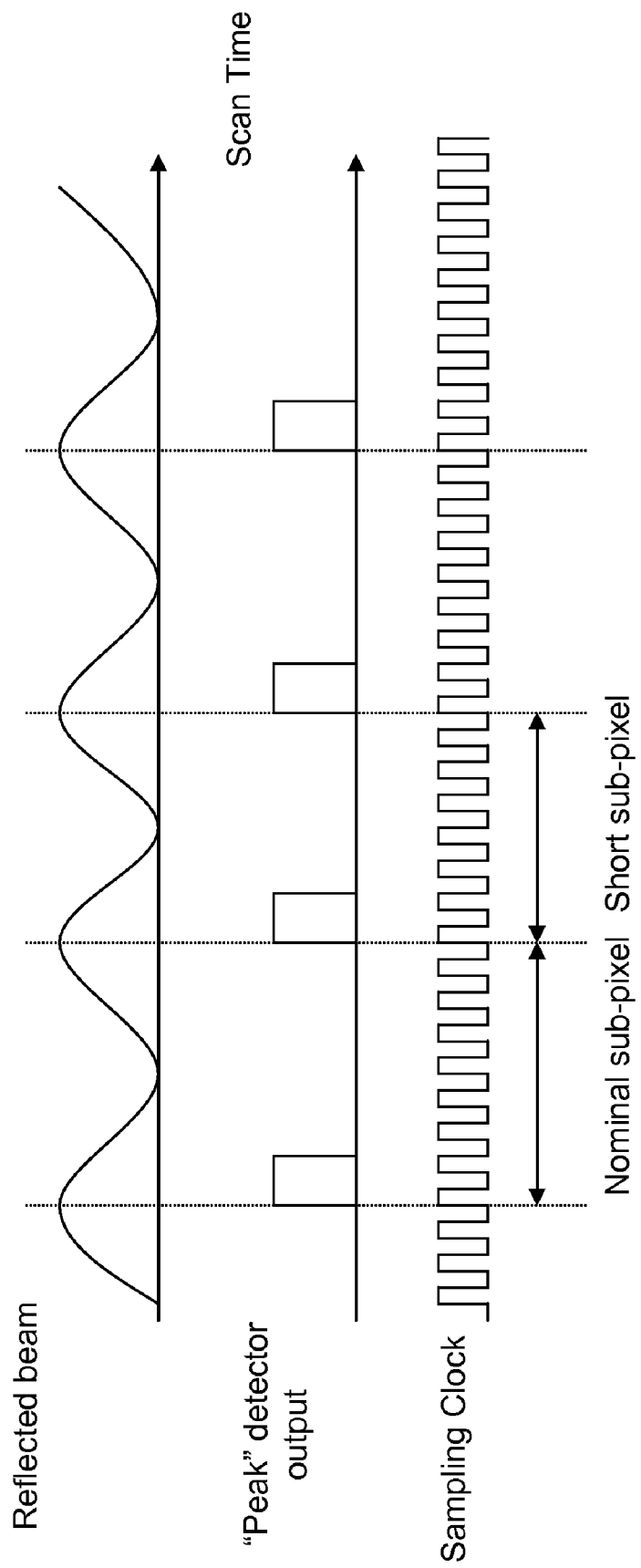
FIGS. 15, 16 and 17 show examples of a use of a sampling clock signal to measure position data of stripe dividers on the screen using servo feedback light from the excitation beam or the servo beam.

FIG. 15 shows one example of the detected reflected feedback light as a function of the scan time for a portion of one horizontal scan, the respective output of the peak detector and the sampling clock signal. A nominal subpixel with a width corresponding to 9 clock cycles of the sampling clock and an adjacent short subpixel corresponding to 8 clock cycles are illustrated. In some implementations, the width of a subpixel may correspond to 10-20 clock cycles. The clock cycle of the sampling clock signal of the digital circuit or microcontroller for the servo control dictates the spatial resolution of the error signal.

Figure 16:
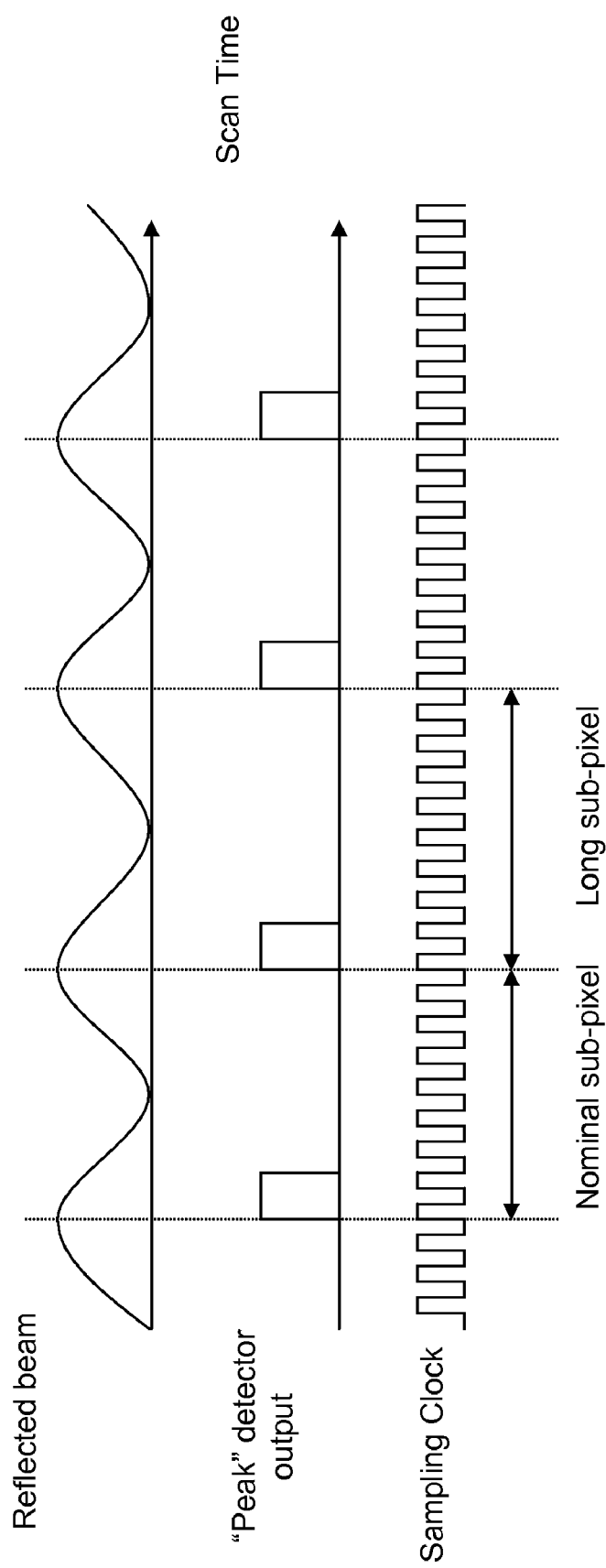

FIG. 16 shows one example of the detected reflected feedback light as a function of the scan time for a portion of one horizontal scan, the respective output of the peak detector and the sampling clock signal where a nominal subpixel corresponding to a width of 9 clock cycles and an adjacent long subpixel a corresponding to a width of 10 clock cycles re illustrated.

Figure 17:
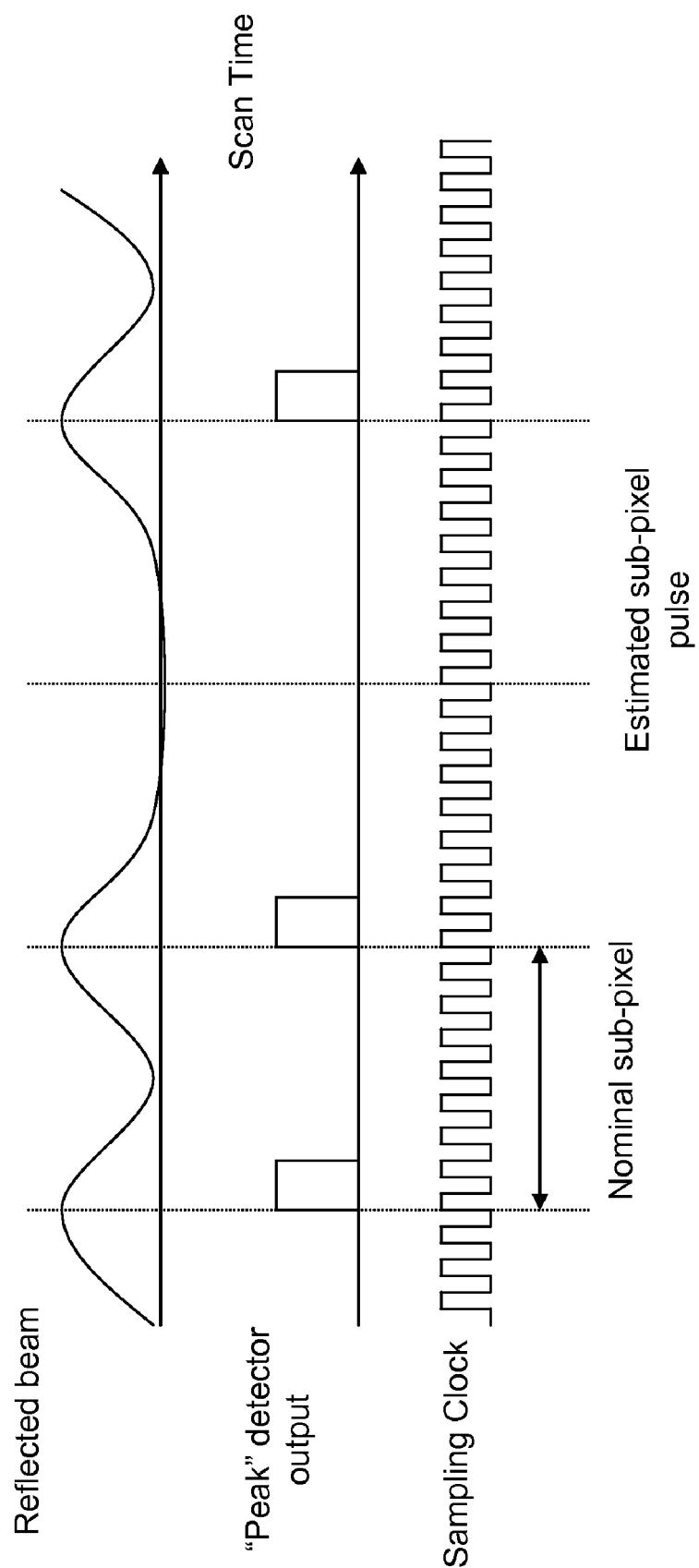

During calibration, contaminants such as dust on the screen, screen defects, or some other factors may cause missing of an optical pulse in the reflected feedback light that would have been generated by a servo reference mark between two adjacent subpixels on the screen 101. FIG. 17 illustrates an example where a pulse is missing. A missing pulse can be determined if a pulse is not sampled or detected within the nominal number of clock cycles for a subpixel within the maximum expected deviation from the nominal number of clocks for a subpixel. If a pulse is missed, the nominal value of clock cycles for a subpixel can be assumed for that missing sub-pixel and the next sub-pixel can contain the timing correction for both sub-pixels. The timing correction can be averaged over both sub-pixels to improve the detection accuracy. This method may be extended for any number of consecutive missed pulses.

The above use of the sampling clock signal to measure the position map of the screen 101 can be used with detection with the excitation servo feedback light 122 or the servo feedback light 132 from the screen 101. Because the excitation beam or beams 120 scan all horizontal lines in the screen 101 during a calibration scan in a CW mode, the position data from the excitation servo feedback light 122 can provide data for each and every subpixel of the screen 101. The position data obtained from the servo beam 130 and its corresponding feedback light 132, however, only covers one horizontal scan line per screen segment as shown in FIG. 5. The position data measured from the servo beam 130 for one screen segment can be used as a representative scan for all horizontal lines in that screen segment is used to update position data for all lines in that screen segment. Two or more servo beams 130 may be used to increase the number of lines measured in each screen segment.

Vertical position of each laser can be monitored and adjusted by using an actuator, a vertical scanner, an adjustable lens in the optical path of each laser beam or a combination of these and other mechanisms. Vertical reference marks can be provided on the screen to allow for a vertical servo feedback from the screen to the laser module. One or more reflective, fluorescent or transmissive vertical reference marks can be provided adjacent to the image area of the screen 101 to measure the vertical position of each excitation beam 120. Referring to FIG. 11, such vertical reference marks can be placed in a peripheral reference mark region. One or more vertical mark optical detectors can be used to measure the reflected, fluorescent or transmitted light from a vertical reference mark when illuminated by the beam 120 or 130. The output of each vertical mark optical detector is processed and the information on the beam vertical position is used to control an actuator to adjust the vertical beam position on the screen 101.

Figure 18A:
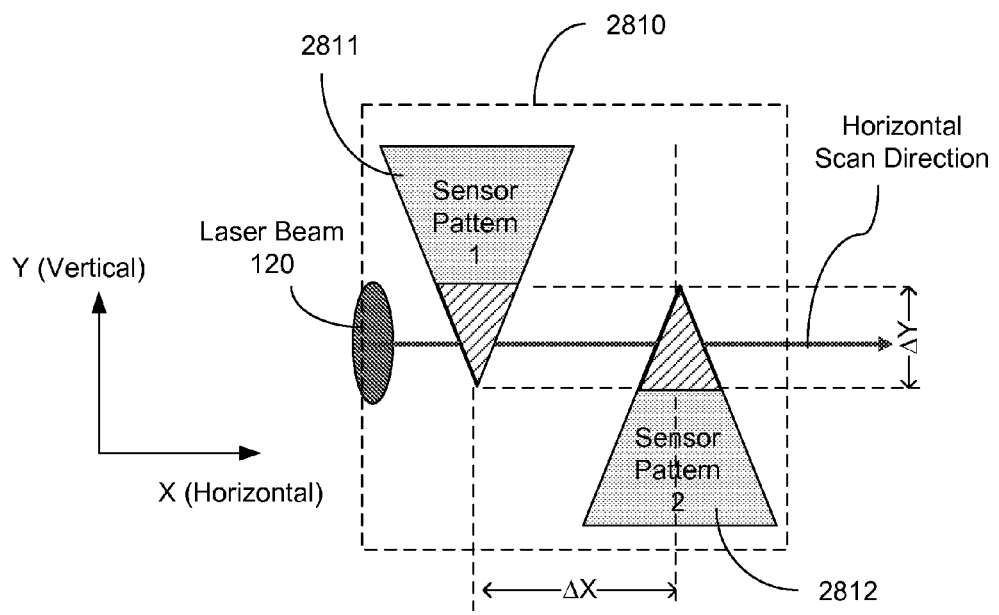
FIG. 18A shows an example of a vertical beam position reference mark for the screen in FIG. 11.

FIG. 18A shows an example of a vertical reference mark 2810. The mark 2810 includes is a pair of identical triangle reference marks 2811 and 2812 that are separated and spaced from each other in both vertical and horizontal directions to maintain an overlap along the horizontal direction. Each triangle reference mark 2811 or 2812 is oriented to create a variation in the area along the vertical direction so that the beam 120 partially overlaps with each mark when scanning through the mark along the horizontal direction. As the vertical position of the beam 120 changes, the overlapping area on the mark with the beam 120 changes in size. The relative positions of the two marks 2811 and 2812 defines a predetermined vertical beam position and the scanning beam along a horizontal line across this predetermined vertical position scans through the equal areas as indicated by the shadowed areas in the two marks 2811 and 2812. When the beam position is above this predetermined vertical beam position, the beam sees a bigger mark area in the first mark 2811 than the mark area in the second mark 2812 and this difference in the mark areas seen by the beam increases as the beam position moves further up along the vertical direction. Conversely, when the beam position is below this predetermined vertical beam position, the beam sees a bigger mark area in the second mark 2812 than the mark area in the first mark 2811 and this difference in the mark areas seen by the beam increases as the beam position moves further down along the vertical direction.

The feedback light from each triangle mark is integrated over the mark and the integrated signals of the two marks are compared to produce a differential signal. The sign of the differential signal indicated the direction of the offset from the predetermined vertical beam position and the magnitude of the differential signal indicates the amount of the offset. The excitation beam is at the proper vertical position when the integrated light from each triangle is equal, i.e., the differential signal is zero.

Figure 18B:
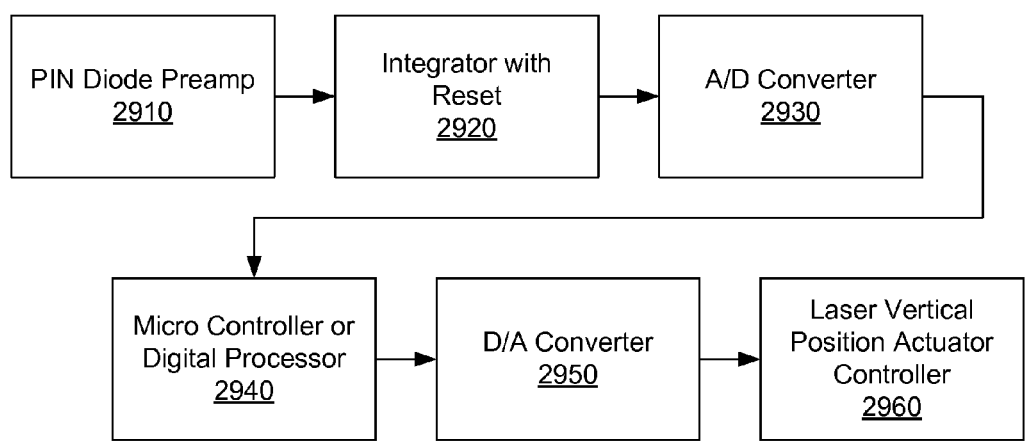

FIG. 18B shows a portion of the signal processing circuit as part of the vertical beam position servo feedback control in the laser module 110 for the vertical reference mark in FIG. 18A. A PIN diode preamplifier 2910 receives and amplifies the differential signal for the two reflected signals from the two marks 2811 and 2812 and directs the amplified differential signal to an integrator 2920. An analog-to-digital converter 2930 is provided to convert the differential signal into a digital signal. A digital processor 2940 processes the differential signal to determine the amount and direction of the adjustment in the vertical beam position and accordingly produces a vertical actuator control signal. This control signal is converted into an analog control signal by a digital to analog converter 2950 and is applied to a vertical actuator controller 2960 which adjusts the actuator. FIG. 18C further shows generation of the differential signal by using a single optical detector.

Figure 19:
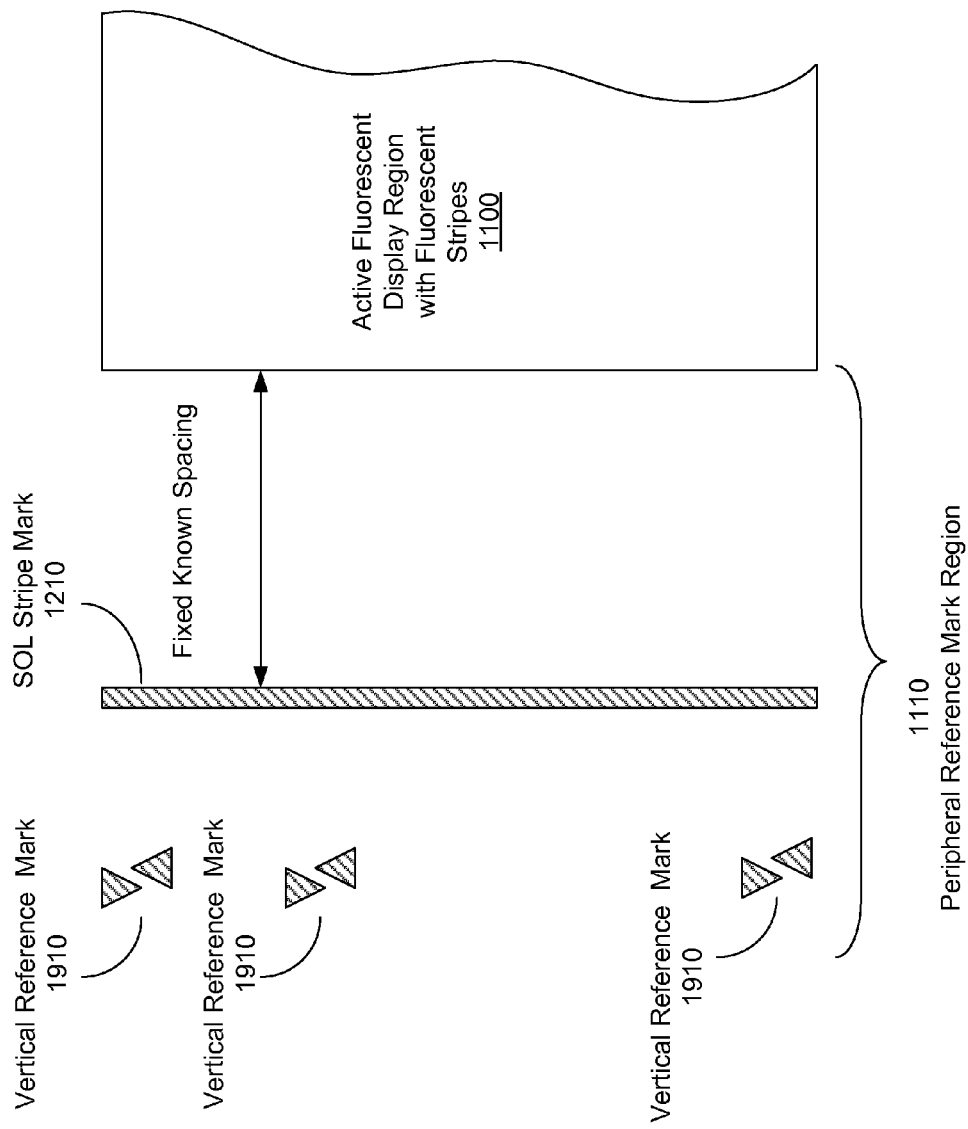
FIG. 19 shows an example of the screen in FIG. 11 having the start of line reference mark and the vertical beam position reference marks.

FIG. 19 shows an example of the screen in FIG. 11 having the start of line reference mark and the vertical beam position reference marks. Multiple vertical beam position reference marks can be placed at different vertical positions to provide vertical position sensing of the excitation beams 120 in all screen segments. In addition, separate from the vertical beam position reference marks for the excitation beams 120, multiple vertical beam position reference marks can be placed at different vertical positions, e.g., one vertical reference mark for the servo beam 130 to provide vertical position sensing of the servo beam 130 in each screen segment. These vertical reference marks are presented by the numeral "1910" in FIG. 19. The combination of the SOL reference 1210, the vertical reference marks 1910 and the periodic pattern in the strip stricture of the light-emitting area 1110 provides positioning information of the invisible servo beam 130, positioning information of the excitation beams 120 and the horizontal parameters of the pixels on the screen 101 for servo control in a scanning display system.

Figure 20:
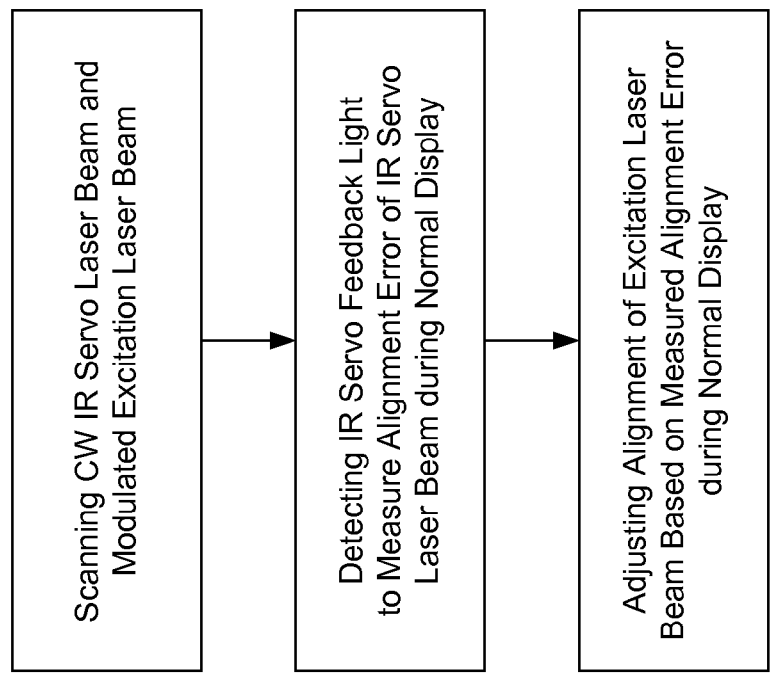
FIG. 20 shows an operation of the servo control based on the servo beam that is scanned with the excitation beam.

FIG. 20 shows an example of the operation of a servo control using the servo beam 130 during the normal display mode when each excitation beam 120 is used for carrying optical pulses for producing images on the screen 101 and is not used for servo control. The servo beam 130 is a CW beam and is scanned over one horizontal line per screen segment with the scanning modulated excitation Laser beams 120. The servo Feedback light 132 is detected by the one or more servo detectors 620 to measure an alignment error of the servo beam 130 on the screen 101 during the normal display. The alignment of each excitation laser beam 120 is adjusted based on the measured alignment error of the servo beam 130 to reduce the alignment error of the excitation laser beam 120.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. A scanning beam display system, comprising:
an excitation light source to produce at least one excitation beam at an excitation wavelength;
a servo light source to produce at least one servo beam at a servo beam wavelength that is different from the excitation wavelength;
a beam scanning module to receive the excitation beam and the servo beam and to scan the excitation beam and the servo beam;
a light-emitting screen positioned to receive the scanning excitation beam and the servo beam and comprising a light-emitting area which comprises (1) parallel light-emitting stripes which absorb light of the excitation beam to emit visible light, and (2) one or more stripe dividers parallel to and spatially interleaved with the light-emitting stripes with each stripe divider being located between two adjacent stripes, each stripe divider being optically reflective to at least the servo beam;
an optical servo sensor positioned to receive light of the servo beam reflected by the stripe dividers and to produce a monitor signal indicative of positioning of the servo beam on the screen; and
a control unit operable to, in response to the positioning of the servo beam on the screen in the monitor signal, adjust timing of optical pulses carried by the scanning excitation beam based on a relation between the servo beam and the excitation beam to control the spatial alignment of spatial positions of the optical pulses in the excitation beam on the screen.

2. The system as in claim 1, wherein:
the servo beam wavelength is greater than each wavelength in a visible spectral range of the visible light emitted by the light-emitting stripes.

3. The system as in claim 1, wherein:
the servo beam and the excitation beam co-propagate along a common optical path from the beam scanning module to the screen.

4. The system as in claim 1, wherein:
the screen comprises a reflective stripe line as a start of line servo reference mark outside the light-emitting area of the screen and parallel to the light-emitting stripes to indicate a reference position of the servo beam and a reference position of the excitation beam during a beginning of a beam scan of the servo beam or the horizontal beam perpendicular to the light-emitting stripes, and
the control unit is operable to, based on received light of the servo beam from the start of line servo reference mark and the stripe dividers, to control the spatial alignment of spatial positions of the optical pulses in the excitation beam on the screen, when the excitation beam scans in the light-emitting area.

5. The system as in claim 4, wherein:
the screen comprises a vertical beam position servo reference mark outside the light-emitting area in a beam scanning path perpendicular to the light-emitting stripes, the vertical beam position servo reference mark producing a vertical beam position servo feedback light when illuminated by the scanning beam to indicate information on a vertical beam position in a vertical direction parallel to the light-emitting stripes.

6. The system as in claim 5, wherein:
the a vertical beam position servo reference mark comprises first and second servo marks separated from each other along the beam scanning path.

7. The system as in claim 1, wherein:
the beam scanning module includes two beam scanners to scan the excitation and servo beams along two orthogonal directions and a projection lens downstream from the two beam scanners to project the scanning excitation and servo beams onto the screen.

8. The system as in claim 1, wherein:
the beam scanning module includes two beam scanners to scan the excitation and servo beams along two orthogonal directions and a projection lens located along an optical path between the two beam scanners to project the scanning excitation and servo beams onto the screen.

9. The system as in claim 1, wherein:
the optical servo sensor comprises a first optical photodetector responsive to light of the servo beam to produce a detector signal for received light of the servo beam.

10. The system as in claim 1, wherein:
the optical servo sensor comprises a first optical photodetector and a first optical filter to filter light entering into the first photodetector to allow passage of the light of the servo beam into the first optical photodetector while rejecting light of the at least one excitation beam.

11. The system as in claim 1, wherein:
the optical servo sensor comprises:
a first optical photodetector and a first optical filter to filter light entering into the first photodetector to allow passage of the light of the servo beam into the first optical photodetector while rejecting light of the at least one excitation beam; and
a second optical photodetector and a second optical filter to filter light entering into the second photodetector to allow passage of the light of the at least one excitation beam into the second optical photodetector while rejecting light of the servo beam.

12. The system as in claim 11, wherein:
the screen comprises a reflective stripe line as a start of line servo reference mark outside the light-emitting area of the screen and parallel to the light-emitting stripes to indicate a reference position of the servo beam and a reference position of the excitation beam, and
the control unit is operable to, based on received light of the servo beam and the at least one excitation beam from the start of line servo reference mark from the first and second photodetectors, to determine a relative position between the servo beam and the at least one excitation beam, and to control the spatial alignment of spatial positions of the optical pulses in the excitation beam on the screen.

13. The system as in claim 1, wherein:
the screen comprises a filter located on one side of the screen opposite to a side that faces the excitation light source, the filter operable to transmit the visible light and to block light of the servo beam.

14. A method for controlling a scanning beam display system, comprising:
scanning at least one excitation beam of an excitation wavelength on a screen with parallel light-emitting stripes in a beam scanning direction perpendicular to the light-emitting stripes to excite the light-emitting stripes to emit visible light, wherein the screen comprises one or more stripe dividers parallel to and spatially interleaved with the light-emitting stripes with each stripe divider being located between two adjacent stripes and each stripe divider is optically reflective;
scanning a servo beam of a servo beam wavelength different from the excitation wavelength on the screen;
detecting light of the scanning servo beam reflected by the one or more stripe dividers to obtain a monitor signal indicative of positioning of the servo beam on the screen; and
in response to the positioning of the servo beam on the screen, adjusting timing of optical pulses carried by the scanning excitation beam based on a relation between the servo beam and the excitation beam to control the spatial alignment of spatial positions of the optical pulses in the excitation beam on the screen.

15. The method as in claim 14, further comprising:
prior to scanning the at least one excitation beam to display images on the screen, performing a calibration scan comprising:
scanning the least one excitation beam in a continuous wave mode to scan over the screen;
detecting reflected excitation light from the one or more stripe dividers to measure peak reflected signals corresponding to the stripe dividers;
processing the reflected excitation light to extract pixel information of pixels on the screen; and
using the extracted pixel information of the pixels on the screen to control timing of the optical pulses in subsequent scanning of the at least one excitation beam modulated with the optical pulses to form images on the screen,
wherein the positioning of the servo beam on the screen is used to modify timing of the optical pulses set by using the extracted pixel information of the pixels on the screen.

16. The method as in claim 14, wherein:
the screen comprises a reflective stripe line as a start of line servo reference mark outside an area of the screen having the light-emitting stripes, the reflective stripe line being parallel to the light-emitting stripes to indicate a reference position of the servo beam and a reference position of the excitation beam, and
the method further comprising:
detecting light of the servo beam and the at least one excitation beam reflected from the start of line servo reference mark, to determine a relative position between the servo beam and the at least one excitation beam, and to control the spatial alignment of spatial positions of the optical pulses in the excitation beam on the screen.

17. The method as in claim 14, comprising:
using a beam position reference mark on the screen that is located outside an area having the parallel light-emitting stripes to reflect light of the at least one excitation beam;
measuring the reflected light from the beam position reference mark to detect an alignment error of the at least one excitation beam; and
adjusting the at least one excitation beam to reduce the alignment error.

18. The method as in claim 14, comprising:
using a beam position reference mark on the screen that is located outside an area having the parallel light-emitting stripes to reflect light of the servo beam;
measuring the reflected light from the beam position reference mark to detect an alignment error of the servo beam; and
adjusting the servo beam to reduce the alignment error.

19. A scanning beam display system, comprising:
a light-emitting screen comprising a light-emitting area which comprises (1) parallel light-emitting stripes which absorb excitation light to emit visible light, and (2) one or more optically reflective stripe dividers parallel to and spatially interleaved with the light-emitting stripes with each stripe divider being located between two adjacent light-emitting stripes;
a plurality of excitation lasers to produce excitation laser beams at an excitation wavelength;
at least one servo light source fixed in position relative to the excitation lasers to produce at least one servo beam at a servo beam wavelength that is different from the excitation wavelength;
a beam scanning module to receive the excitation laser beams and the servo beam and to scan the excitation laser beams and the servo beam on the screen;
at least one first optical servo sensor positioned to receive light of the servo beam reflected from the screen to produce a first monitor signal indicative of positioning of the servo beam on the screen;
at least one second optical servo sensor positioned to receive light of the excitation laser beams reflected from the screen to produce a second monitor signal indicative of positioning of each excitation laser beam on the screen; and
a control unit operable to, in response to the first and the second monitor signals, adjust timing of optical pulses carried by each excitation laser beam based on a relation between the servo beam and each excitation laser beam to control the spatial alignment of spatial positions of the optical pulses in the excitation beam on the screen.

20. The system as in claim 19, wherein:
the screen comprises a reflective stripe line as a start of line servo reference mark outside the light-emitting area of the screen and parallel to the light-emitting stripes to indicate a reference position of the servo beam and a reference position of each excitation laser beam, and
the control unit is operable to, based on received light of the servo beam and each excitation laser beam reflected from the start of line servo reference mark, to determine a relative position between the servo beam and each excitation laser beam, and to control the spatial alignment of spatial positions of the optical pulses in the excitation beam on the screen.

* * * * *

UNITED STATES PATENT AND TRADEMARK OFFICE
CERTIFICATE OF CORRECTION

| | | |
|---|---|---|
| PATENT NO. | : 7,878,657 B2 | Page 1 of 1 |
| APPLICATION NO. | : 11/769580 | |
| DATED | : February 1, 2011 | |
| INVENTOR(S) | : Roger A. Hajjar | |

It is certified that error appears in the above-identified patent and that said Letters Patent is hereby corrected as shown below:

Column 22, Line 11 at Claim 6; replace:
"the a vertical beam position servo reference mark com-" with
-- the vertical beam position servo reference mark com- --

Signed and Sealed this
Fifth Day of April, 2011

David J. Kappos
*Director of the United States Patent and Trademark Office*